United States Patent
Premy et al.

(10) Patent No.: US 9,622,203 B2
(45) Date of Patent: Apr. 11, 2017

(54) LOW POWER COMMUNICATION SYSTEM AND METHOD

(71) Applicant: WiZN Systems Pvt. Ltd, Bangalore (IN)

(72) Inventors: Amit Premy, Bangalore (IN); Arvind Pawaskar, Bangalore (IN)

(*) Notice: Subject to any disclaimer, the term of this patent is extended or adjusted under 35 U.S.C. 154(b) by 305 days.

(21) Appl. No.: 14/546,167

(22) Filed: Nov. 18, 2014

(65) Prior Publication Data

US 2016/0057722 A1 Feb. 25, 2016

(30) Foreign Application Priority Data

Aug. 19, 2014 (IN) .......................... 4042/CHE/2014

(51) Int. Cl.
  H04B 7/14 (2006.01)
  H04W 56/00 (2009.01)
  H04W 84/20 (2009.01)
  H04B 7/145 (2006.01)

(52) U.S. Cl.
  CPC ........ H04W 56/0015 (2013.01); H04B 7/145 (2013.01); H04W 84/20 (2013.01)

(58) Field of Classification Search
  CPC .................................................. H04B 7/2606

USPC ........................................................ 370/315
See application file for complete search history.

(56) References Cited

U.S. PATENT DOCUMENTS

2009/0137206 A1* 5/2009 Sherman ............... H04W 16/14
  455/41.2
2015/0103768 A1* 4/2015 Chen ................... H04W 68/025
  370/329

* cited by examiner

*Primary Examiner* — Christopher R Crompton
(74) *Attorney, Agent, or Firm* — The Law Office of Austin Bonderer, PC; Austin Bonderer

(57) ABSTRACT

A communication system is disclosed herein. The communication system includes a master device that includes a master clock and is connected to a host through a communication network, and a plurality of nodes connected to the master device. The master device transmits one or more periodic beams that include a radio frequency. Each of the nodes includes a node clock that is configured and in synchronization with the master clock based on the one or more periodic beams. The communication system establishes a connection for communication between the master device and at least one node when the node clock of the at least one node is in synchronization with the master clock. The communication system further includes at least one repeater 104A operatively connected between the master device and at least one node.

11 Claims, 22 Drawing Sheets

TIMING DIAGRAM WITH REPEATER

LOW POWER COMMUNICATION SYSTEM AND METHOD

BACKGROUND

Technical Field

The embodiments herein generally relate to communication system, and, more particularly, to a hybrid form of low power synchronous and asynchronous communication system.

Description of the Related Art

Communication is the transfer of information between two or more points that are not connected by an electrical conductor. A low power network allows networked devices to run on batteries. Nowadays network devices can be mobile (hand held device) and can be placed in locations where there is no direct electricity supply. This is more necessary in today's life where day to day things are connected with the internet. There are various applications being used for example home automations, security and sensor networks likewise. A network usually consists of one master and multiple devices or nodes. The master and the nodes communicate on a specific channel. In the network device, communication between master and nodes over a medium typically consumes most of the power. For example, a node communicating over radio frequency (RF) will consume most of it power during RF activity. A radio frequency (RF) reception and transmission consumes large amount of power and less power will be conserved. The radio in the node is turned OFF periodically to reduce the consumption of power. The nodes turns ON for a small amount of time to reduce the consumption of power, does required actions and then turns OFF again. Since each node is in OFF state most of the time, the power consumption is reduced by the factor of (ON Time+OFF Time)/OFF Time. Low power networks architectures like Zigbee and BLE (Bluetooth Low Energy) are based on the principle of polling. Principle of polling means when the device wakes up, it tries to communicate with the master device and checks if the master device has any relevant data for it. Once the necessary action is over, network device goes to sleep again.

The reduction in power is directly proportional to the sleep time of the network device. This has direct effect on the responsiveness of the network device. The problem with the existing networks is that the low power is advantage is traded-off for better responsiveness. Since the overhead associated with each polling cycle is large, the power advantage is greatly reduced if the device has to be more responsive. For polling, each device has to transmit after wake-up. If there are many devices in the network, the RF activity proportionately increases resulting in higher chances of collisions and eventual clogging of network. Collision may force the network device to be ON for longer duration and therefore increases the power consumption of the network device in the network.

Thus, the existing communication networks are not highly efficient in reducing the consumption of power, if they have to be responsive. Accordingly, there remains a need for a low power, low cost, reliable and secure communication system for network devices that can run efficiently on battery power without degrading their responsiveness.

SUMMARY

In view of the foregoing, an embodiment herein provides a communication system comprising: a master device connected to a host through a communication network, wherein the master device comprises a master clock; a first node operatively connected to the master device through the communication network, wherein the first node receives a first periodic beam comprising a radio frequency from the master device, wherein the first node comprises a first node clock that is configured and in synchronization with the master clock based on the first periodic beam comprising the radio frequency; and a second node operatively connected to the master device through the communication network, wherein the second node receives the first periodic beam comprising the radio frequency from the master device, wherein the second node comprises a second node clock that is configured and in synchronization with the master clock based on the first periodic beam comprising the radio frequency, and wherein the communication system establishes a connection for communication between at least one of (i) the master device and the first node when the first node clock is in synchronization with the master clock, and (ii) the master device and the second node in the communication network when the second node clock is in synchronization with the master clock.

The communication system further comprises a first repeater that is operatively connected to the master device, the first node, and the second node through the communication network, wherein the first repeater (i) receives the first periodic beam comprising the radio frequency from the master device, and (ii) transmits the first periodic beam comprising the radio frequency to the communication network, wherein the first repeater synchronizes with the master clock based on the first periodic beam comprising the radio frequency. The master device may further transmit at least one of (i) a second periodic beam comprising (a) the radio frequency, (b) a unique network identifier, and (ii) data specific to at least one of the first node and the second node, and wherein at least one of the first node or the second node transmits an acknowledgement to the master device when the data is received by at least one of the first node and the second node.

The first node is configured to (i) determine a first clock time period offset between a clock period of the first node and a clock period of the master device based on the first periodic beam and the second periodic beam, (ii) calculate a next wake-up time comprising a first node wake up time information specific based on the first clock time period offset, (iii) reset the first node clock to be in synchronization with the master clock of the master device based on the first clock time period offset, and (iv) update periodically the first clock time period offset based on a number of subsequent beams received by the first node to obtain a first updated clock time period offset, wherein the first node wakes up for a predetermined time interval to receive at least one of (i) a periodic beam, (ii) data, or (iii) a periodic beam appended with data from the master device based on the updated clock time period offset specific to the first node, and wherein the first node is configured to go in a sleep mode when at least one of (i) the periodic beam, (ii) the data, or (iii) the periodic beam appended with the data is not received during the predetermined time interval.

The second node is configured to (i) determine a second clock time period offset between a clock period of the second node and a clock period of the master device based on the first periodic beam and the second periodic beam, (ii) calculate a next wake-up time comprising a second node wake up time information based on the second clock time period offset, (iii) reset the second node clock to be in synchronization with the master clock of the master device based on the second clock time period offset, and (iv) periodically update the second clock time period offset based on a number of subsequent beams received by the second node to obtain a second updated clock time period offset, wherein the second node wakes up for a predetermined time interval to receive at least one of (i) a periodic beam, (ii) data, or (iii) a periodic beam appended with data from the master device based on the second updated clock time period offset specific to the second node, and wherein the second node is configured to go in a sleep mode when at least one of (i) the periodic beam, (ii) the data, or (iii) the periodic beam appended with the data is not received during the predetermined time interval.

The master device is further configured to reduce subsequent periodic beams transmission based on the first updated clock time period offset computed by the first node, and the second updated clock time period offset computed by the second node. The communication system further comprises a second repeater operatively connected to the master device, the first repeater, and at least one of the first node or the second node, wherein the master device transmits at least one of (i) a periodic beam, (ii) data, or (iii) the periodic beam appended with the data to at least one of the first node or the second node through at least one of the first repeater and the second repeater, and wherein the first node communicates with the second node through the master device by transmitting a beam comprising a message that comprises a header information to the second node. The first node and the second node are configured to scan the communication network using at least one of a secondary polling or a master device polling to obtain a time and a frequency of a subsequent beam that is to be transmitted by the master device when at least one of the first node or the second node are disconnected from the communication network and reconnected to the communication network, wherein the secondary polling or the master device polling is done through a common communication channel.

In another embodiment, a communication method, comprising: transmitting by a master device a first periodic beam comprising a radio frequency to a first node that is operatively connected to the master device through a communication network, wherein the master device comprises a master clock, and wherein the first node comprises a first node clock; transmitting by the master device the first periodic beam comprising the radio frequency to a second node that is operatively connected to the master device through the communication network, wherein the second node comprises a second node clock; performing a synchronization between (i) the master clock of the master device with the first node clock of the first node (ii) the master clock of the master device with the second node clock of the second node, based on the first periodic beam comprising the radio frequency; and in response to performing the synchronization, establishing a connection for communication between at least one (i) the master device and the first node, and (ii) the master device and the second node in the communication network is provided. The communication method further comprises transmitting by the master device the first periodic beam comprising the radio frequency radio to a repeater that is operatively connected to the master device through the communication network, wherein the repeater transmits the first periodic beam to the first node and the second node, transmitting by the master device at least one of (i) a second periodic beam comprising (a) the radio frequency, (b) a unique network identifier and (ii) data that is specific to at least one of the first node, and the second node; receiving by the master device an acknowledgement from at least one of the first node or the second node when the data is received by at least one of the first node or the second node.

The first node is configured to (i) determine a first clock time period offset between a clock period of the first node and a clock period of the master device based on the first periodic beam and the second periodic beam, (ii) calculate a next wake-up time comprising a first node wake up time information specific based on the first clock time period offset, (iii) reset the first node clock to be in synchronization with the master clock of the master device based on the first clock time period offset, and (iv) update periodically the first clock time period offset based on a number of subsequent beams received by the first node to obtain a first updated clock time period offset, wherein the first node wakes up for a predetermined time interval to receive at least one of (i) a periodic beam, (ii) data, or (iii) a periodic beam appended with data from the master device based on the updated clock time period offset specific to the first node, and wherein the first node is configured to go in a sleep mode when at least one of (i) the periodic beam, (ii) the data, or (iii) the periodic beam appended with the data is not received during the predetermined time interval.

The second node is configured to (i) determine a second clock time period offset between a clock period of the second node and a clock period of the master device based on the first periodic beam and the second periodic beam, (ii) calculate a next wake-up time comprising a second node wake up time information based on the second clock time period offset, (iii) reset the second node clock to be in synchronization with the master clock of the master device based on the second clock time period offset, and (iv) periodically update the second clock time period offset based on a number of subsequent beams received by the second node to obtain a second updated clock time period offset, wherein the second node wakes up for a predetermined time interval to receive at least one of (i) a periodic beam, (ii) data, or (iii) a periodic beam appended with data from the master device based on the second updated clock time period offset specific to the second node, and wherein the second node is configured to go in a sleep mode when at least one of (i) the periodic beam, (ii) the data, or (iii) the periodic beam appended with the data is not received during the predetermined time interval.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
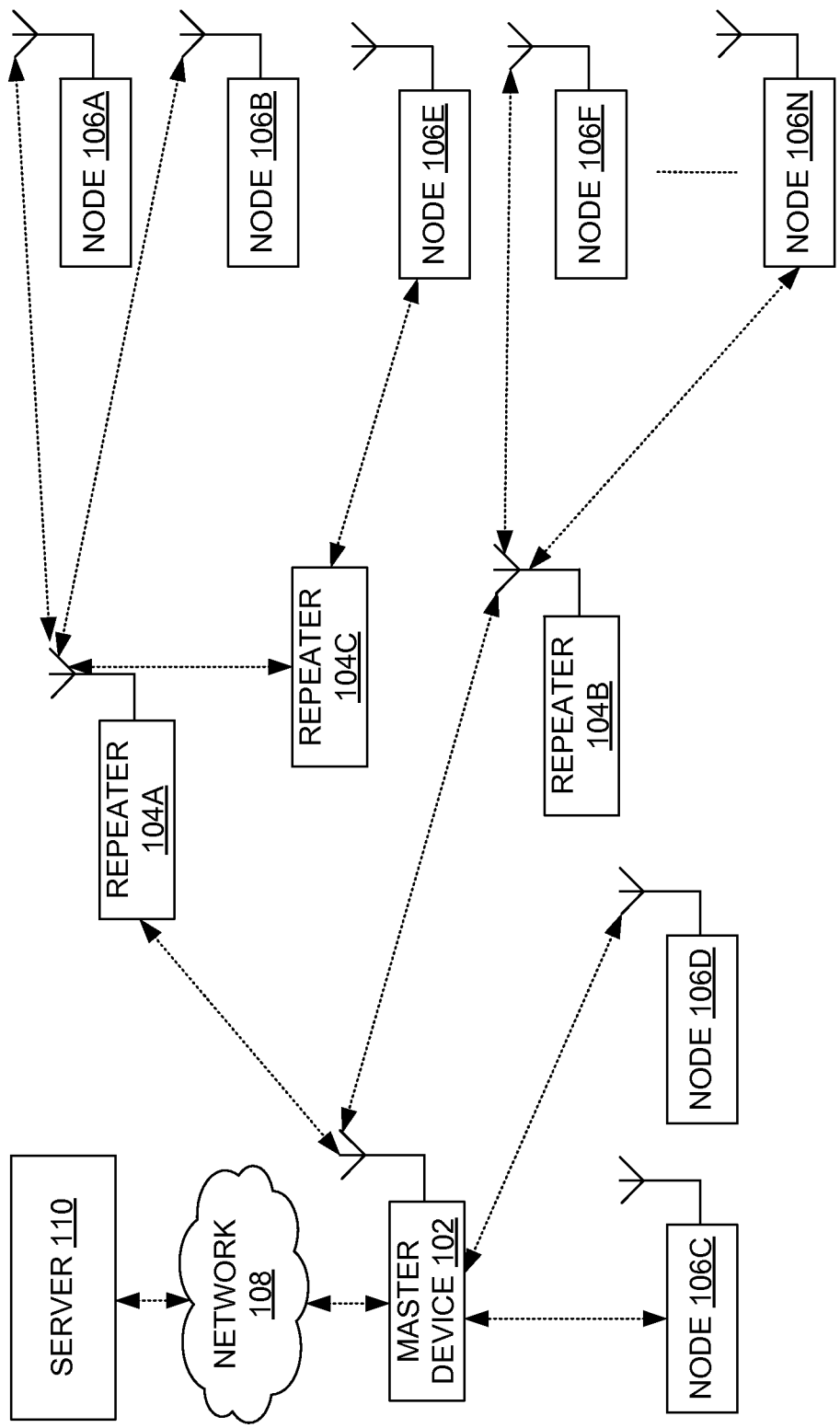
FIG. 1 illustrates a communication system according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a low power, low cost, reliable and secure communication system for network devices that can run efficiently and be responsive. The embodiments herein achieve this by providing a communication system and method that comprises a master device connected to a host through a communication network, wherein the master device comprises a master clock; a plurality of node operatively connected to the master device through the communication network, the nodes receives a first periodic beam comprising a radio frequency from the master device, each node comprises a node clock that is configured and in synchronization with the master clock based on the first periodic beam comprising the radio frequency, and each node transmits a data comprising an acknowledgement to the master device when a first periodic beam appended with a data is received by them. The communication system further comprises one or more repeaters used for extending the communication network. The repeaters receive the periodic beam and transmit the same to the nodes. The nodes calculate the offset between the master device and them using these periodic beams, and adjust their node clock such that they are in synchronization with the master clock. The nodes further calculate wake up time based on the offset and thus know when the master device is likely to send the next beam, and accordingly wake up just before the time the beam is transmitted by the master device. Referring now to the drawings, and more particularly to FIGS. 1 through 12, where similar reference characters denote corresponding features consistently throughout the figures, there are shown preferred embodiments.

FIG. 1 illustrates a communication system 100 according to an embodiment herein. The communication system 100 that includes a master device 102, one or more repeaters 104A-C, one or more nodes 106A-N, a network 108, and a server 110. The master device 102 may be a network controller, a coordinator, and/or a remote control device, etc. The master device 102 is connected to the internet using a network device comprising a router or a modem. The master device 102 is connected to a host through a communication network. The host comprises a local machine, or a cloud or the server 110. The master device 102 comprises a master clock. The master device 102 is connected to the one or more nodes 106A-N. The master device 102 is connected to the repeaters 104A-B which are further connected to the one or more nodes 106A-N. The repeater 104A is further connected to a repeater 104C that is connected to a node 106E. The master device 102 is connected to each of the nodes 106A-N and each of the repeaters 104A-B through a periodic beam, using which the nodes 106A-N set their clock and synchronize with the master clock and ensure that the nodes 106A-N and the master device 102 operate at the same frequency. The nodes 106A-N are operatively connected to the master device 102 either directly or through the repeater 104A-C. For example, a first node 106A is operatively connected to the master device 102 through the communication network via a repeater 104A. Whereas the node 106C is directly connected to the master device 102. The first node 106A receives a first periodic beam comprising a radio frequency from the master device 102. The first node comprises a first node clock that is configured and in synchronization with the master clock 102 based on the first periodic beam comprising the radio frequency. The first node 106A transmits data comprising a first acknowledgement to the master device 102 when the first periodic beam is received by the first node. Likewise, a second node 106B is operatively connected to the master device 102 through the communication network. The second node 106B receives the first periodic beam comprising the radio frequency from the master device 102. The second node 106B comprises a second node clock that is configured and in synchronization with the master clock based on the first periodic beam comprising the radio frequency. The second node 106B transmits data comprising a second acknowledgement to the master device 102 when the second periodic beam appended with a data is received by the second node 106B. It is to be understood to a person having ordinary skill in the art that each node comprises a node clock comprising a clock period. The clock period for each node is determined by the respective nodes, and the offset is adjusted based on one or more periodic beams received from the master device 102.

The frequency of the periodic beam is selected from a group comprising available spectrum and factors comprising range, interference and power, etc. Once the master device 102, the repeaters 104A-C, and the nodes 106A-N are synchronized, the master device 102 transmits data through a periodic beam. Thus, each periodic beam that is transmitted between the master device 102 and the nodes 106A-N comprises a valid network identifier specific to a node and optionally data that is transmitted to the node. Data is transmitted from either (i) the master device 102 to at least one repeater which further transmits to at least one node, or (ii) the master device 102 to the at least one node, or vice versa. Each repeater (e.g., the repeaters 104A-B) is operatively connected to the master device 102 either directly or through another repeater and/or the nodes 106A-N within the communication network. For example, the repeater 104A is directly connected to the master device 102 and the nodes 106A-B. Similarly, the repeater 104B is directly connected to the master device 102 and the nodes 106F-N. Likewise, the repeater 104C is only connected to the repeater 104A and the node 106E, and is further connected to the master device 102 only through the repeater 104A. The repeater 104A (i) receives the first periodic beam comprising the radio frequency from the master device 102, and (ii) transmits the first periodic beam comprising the radio frequency to the first node 106A and the second node 106B. Likewise, the repeater 104A may transmit a periodic beam (and/or data received from the master device 102) comprising the radio frequency to another repeater 104C that further transmits to other addressed nodes (e.g., the node 106E). Routing information on such transmission is initially collected during each node configuration. The master device 102 stores routing information for each node in its database 206.

The master device 102 and each repeater 104A-N are assigned a designated slot. The designated slots avoid collisions between each periodic beam in the communication system 100. The master device 102 transmits a second periodic beam either directly to the nodes 106A-N or through the repeaters 104A-C. The second periodic beam comprises (i) the same radio frequency, (ii) a unique network identifier and (iii) data that is specific to at least one of the first node 106A, and the second node 106B. Data relevant to at least one node 106A accepts it, and the rest of the nodes 106B-N listen to the periodic beam, ignore the data and go to sleep mode. As way of clarity, the master device 102 transmits data comprising processor executable instructions to each node 106A-N. Data relevant to a node 106A comprising a lighting switch accepts the processor executable instructions in a first mode comprising a wake up mode. Other nodes 106B-N comprising a temperature sensor, door lock may ignore the data and enter into a second mode comprising a sleep mode. Once the data transmission between the master device 102 and the node 106A completes, the node 106A acknowledges the master device 102. The duration of the periodic beam depends on the data it is carrying. The master device 102 may also combine data for more than one node and append to a periodic beam. Data relevant to one or more addressed nodes 106A-N is accepted by respective nodes and the rest of the nodes listen to the periodic beam, ignore the data and go to sleep mode. This helps in better responsiveness as data can be sent to multiple nodes in one designated slot.

In one example embodiment, the same communication system 100 and method is used by mobile nodes. For example, the communication system 100 is connected through a network protocol such as an Internet Protocol (TCP/IP), or UDP may be higher-level protocols like HTTP. When the mobile nodes come back into the communication system 100 for a while, the mobile nodes may perform a secondary polling and acquire a next time slot for the one or more periodical beams to quickly synchronize back into the communication system 100 without existing on for longer time. The master device 102 needs to associate with a user to authorize the communication system 100, in a preferred embodiment. When the communication system 100 introduces a new node, the user may associate the new node with the communication system 100.

A client application on the server 110 may be used to validate that the user is the rightful owner of the master device 102. For example, the application may be computer software, a software application, an application program. In one embodiment, the user requests to provide address (e.g., MAC address) of the master device 102 which is shipped along with the master device 102 for validation. The unique addresses (e.g., MAC address) are randomly generated and assigned to the master device 102 while manufacturing. For example, the valid address (e.g., MAC address) is associated with the user who is using his/her profile which includes User Id, Password, Email, etc. Whereas the master device 102 is stolen, the master device 102 cannot be used by other users other than the valid user. Once the master device 102 is commissioned, one or more nodes 106A-N may be associated with the communication system 100. In one embodiment, a button (mechanical/electrical switch or touch interface) is provided for the one or more nodes 106A-N. To associate the nodes 106A-N, the user has to use an application which connects to the master device 102 (either on the host machine or a webpage) to inform the master device 102 that the user is associating the one or more nodes 106A-N.

The master device 102 immediately starts listening on the secondary polling with common configuration for association request from the one or more nodes. The master device 102 instructs the repeaters 104A-B to perform the same functionality. Once the master device 102 and the one or more repeaters 104A-C are in the commissioning mode, the master device 102 requires the user to provide an input (e.g., press the button) on the one or more nodes 106A-N which needs to be commissioned. When the input is provided (e.g., when the button is pressed), the one or more nodes know that the user is trying to associate the nodes 106A-N with the communication system 100. When the master device 102 receives the request, it alerts the user to provide all the details of the one or more nodes which are trying to associate. Once the user confirms, the master device 102 provides all the network information such as network identifiers, hopping sequence, security keys and other details to the one or more nodes 106A-N and completes the commissioning process. Once the node is commissioned, all the communication with master device 102 including secondary polling will occur only with the associated network identifier (ID). Similarly, a process of disassociation is also defined. For example, disassociation may be directly done by the master device 102 based on the user request.

Figure 2:
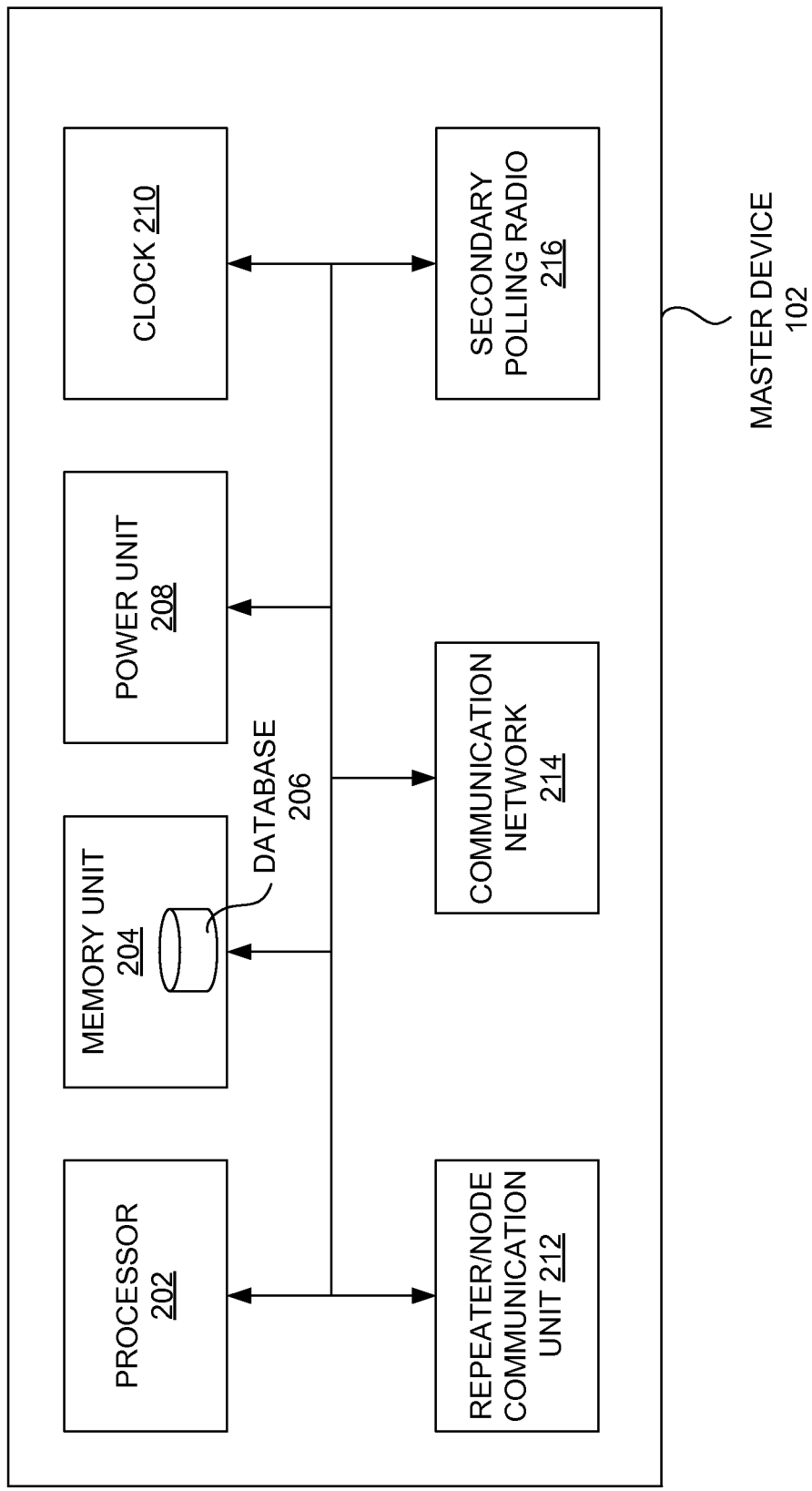
FIG. 2 illustrates a block diagram of a master device of FIG. 1 according to an embodiment herein.

With reference to FIG. 1, FIG. 2 illustrates a block diagram of the master device 102 of FIG. 1 according to an embodiment herein. The master device 102 comprises a processor 202, a memory unit 204, a database 206, and a set of executable instructions to configure the processor 202, a power unit 208, a clock 210, a repeater/node communication unit 212, a communication network 214, and a secondary polling radio 216 (e.g., a radio). The processor 202 is configured by the instructions to execute the controlling unit 212 and the connection enabling unit 214. The database 206 comprises information associated with connected nodes and connected repeaters within the network. The information comprises, but not limited to, beam transmission time, data transmission, nodes wake up time, and/or nodes sleep time, etc. The power unit 208 comprises a battery source that supplies power to components within the master device 102. The power unit 208 may comprise solar cells (photovoltaic cells) which power the master device 102. The clock 206 synchronizes the master device 102 with the one or more repeaters 104A-C and the one or more nodes 106A-N. The master device 102 transmits a beam to each node. Once the beam is received by each node, the nodes 106A-N adjust their system clock (e.g., a node clock) to the system clock (e.g., a master clock) of the master device 102 and be in synchronization with the master device 102.

The processor 202 controls operations and communications between the master device 102, the repeaters 104A-C and the nodes 106A-N. The repeater/node communication unit 212 enables a communication between the master device 102 and the repeaters 104A-C and the nodes 106A-N. The communication network 214 enables the master device 102 to form a communication network between the repeaters 104A-C and the nodes 106A-N. A unique network identifier is assigned to the communication network that enables the master device 102 to communicate with the repeaters 104A-C and the nodes 106A-N. In one example embodiment, the communication system 100 is configured as a star configuration/network. For example, star configuration comprises a master device and no repeaters. Another example, the network is a tree configuration that comprises a master device and one or more repeaters.

Figure 3:
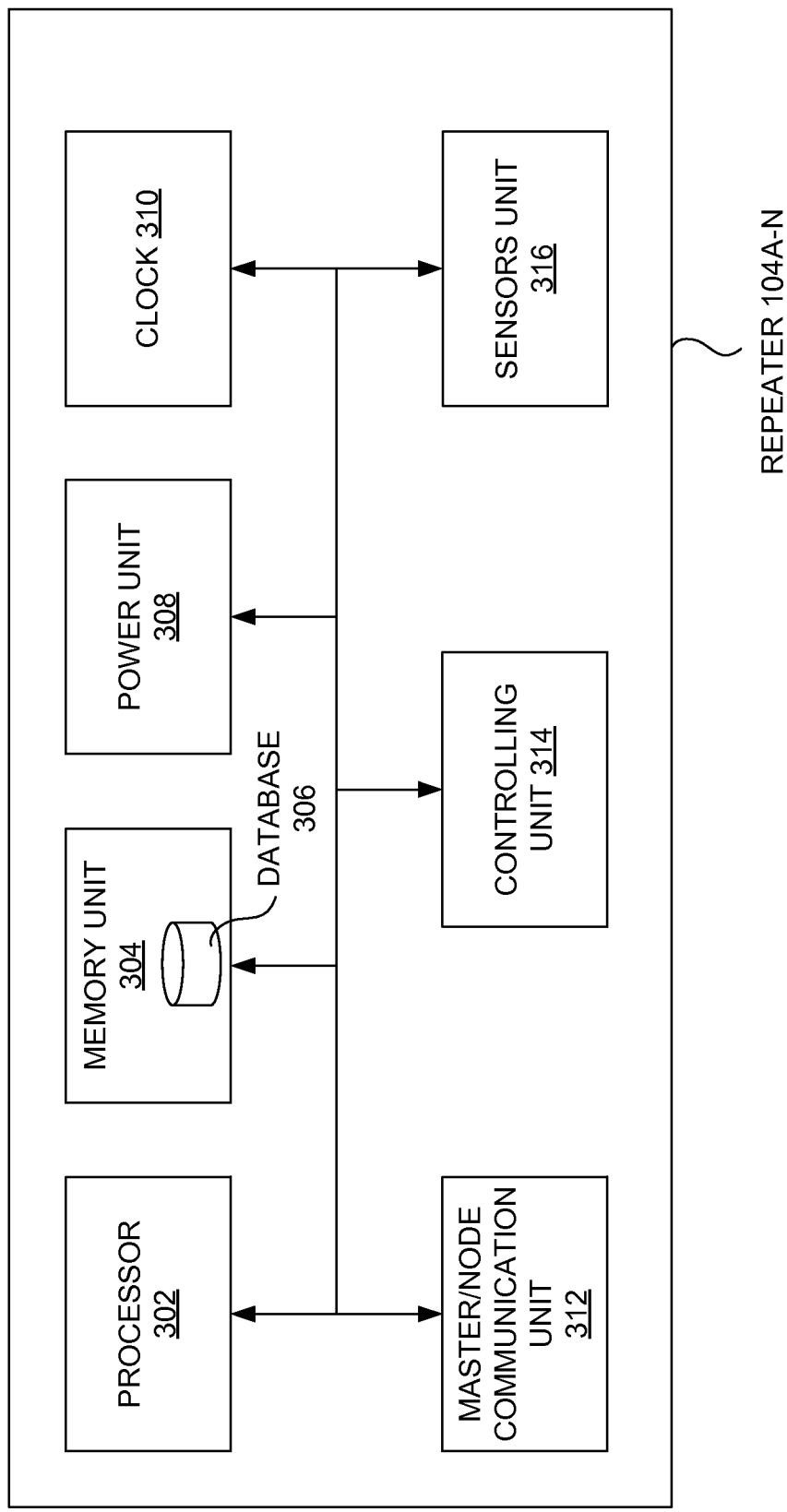
FIG. 3 illustrates a block diagram of one or more repeaters of FIG. 1 according to an embodiment herein.
Figure 4:
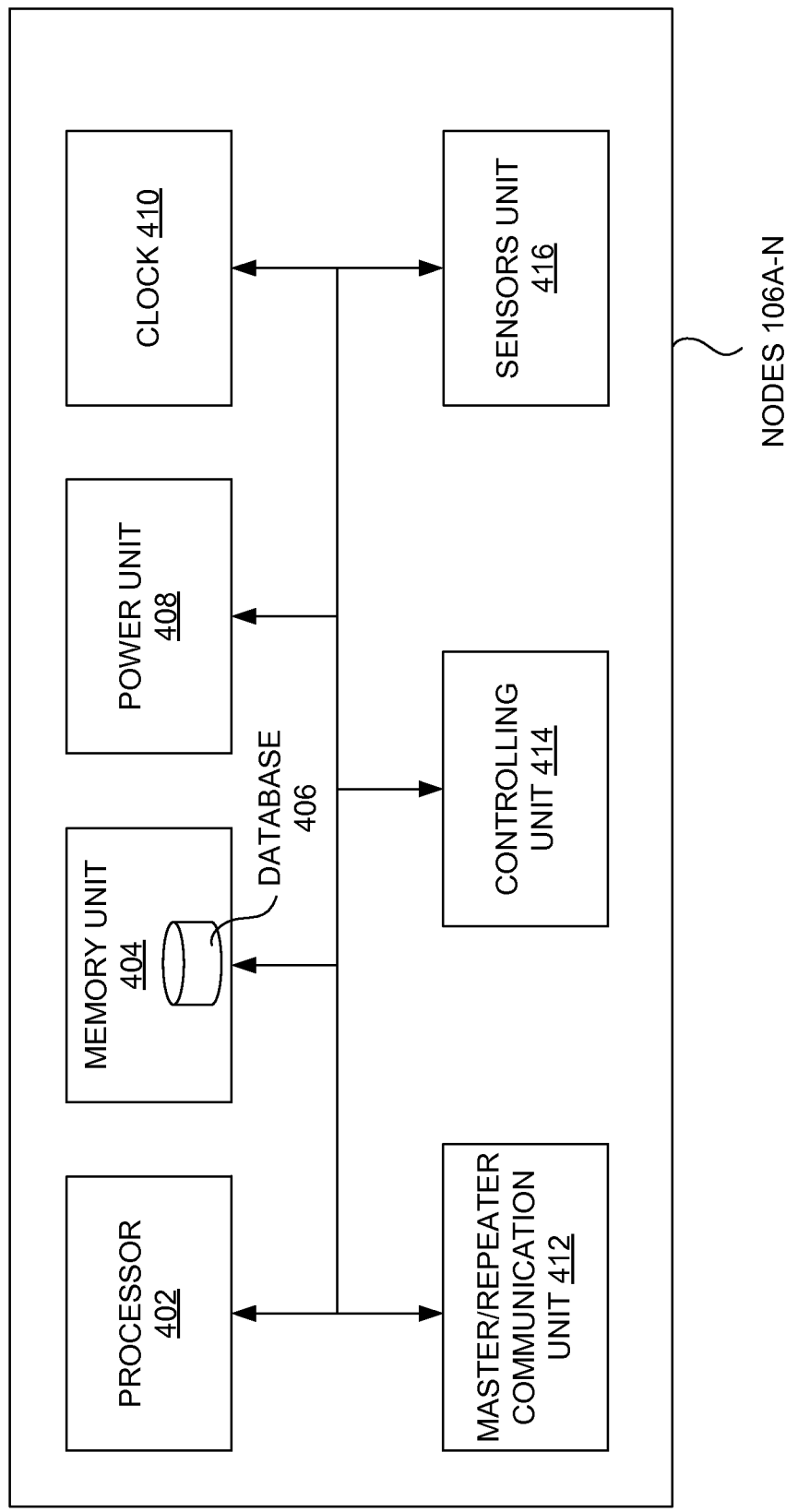
FIG. 4 illustrates a block diagram of one or more nodes of FIG. 1 according to an embodiment herein.

With reference to FIGS. 1 and 2, FIG. 3 illustrates a block diagram of the one or more repeaters 104A-C of FIG. 1 according to an embodiment herein. The one or more repeaters 104A-C includes a processor 302, a memory unit 304 comprising a database 306, and set of computer executable instructions, a power unit 308, a clock 310, a master/node communication unit 312, a controlling unit 314, and a sensors unit 316. The processor 302 is configured by the set of computer executable instructions to execute the power unit 308, the clock 310, the master/node communication unit 312, the controlling unit 314, and the sensors unit 316. The database 306 comprises information associated with connected nodes and connected repeaters within the network. The information comprises, but not limited to, beam transmission time, data transmission, nodes wake up time, and nodes sleep time, etc. The power unit 308 comprises a battery source that supplies power to components within the one or more repeaters 104A-C. The power unit 308 may also comprise of alternate energy source such as solar cells (photovoltaic cells) which charge the battery and power the one or more repeaters 104A-B. The clock 310 synchronizes the one or more repeaters 104A-C with the master device 102 and the nodes 106A-B and the nodes 106E-N. The radio unit 310 enables the repeaters 104A-C to receive and transmit information from the master device 102 to the nodes 106A-B and the nodes 106E-N and vice versa. The controlling unit 314 controls operations and communications between the master device 102, the repeaters 104A-C and the nodes 106A-B and the nodes 106E-N. The sensors unit 316 may comprise, but not limited to, temperature and humidity sensors, light sensors, fire alarm sensors, leak sensors, proximity sensors, glass break sensors, driveway probes (to detect whether a vehicle is arriving inside or leaving from a premise, and/or gas or smoke sensors, etc.

With reference to FIGS. 1 through 3, FIG. 4 illustrates a block diagram of the one or more nodes 106A-N of FIG. 1 according to an embodiment herein. The one or more nodes 106A-N includes a processor 402, a memory unit 404 comprising a database 406, and set of computer executable instructions, a power unit 408, a clock 410, a master/repeater communication unit 412, a controlling unit 414, and a sensors unit 416. The processor 402 is configured by the set of computer executable instructions to execute the power unit 408, the clock 410, the master/repeater communication unit 412, the controlling unit 414, and the sensors unit 416. The database 406 comprises information associated with the master device 102, other connected nodes and connected repeaters 104A-C within the communication network. The information comprises, but not limited to, beam transmission time, data transmission, nodes wake up time, and nodes sleep time, etc. The power unit 408 comprises a battery source that supplies power to components within the one or more nodes 106A-N. The power unit 408 comprises solar cells (photovoltaic cells) which power the one or more nodes 106A-N and its components. The clock 410 synchronizes the one or more nodes 106A-N with the master device 102 and the one or more repeaters 104A-C. The clock 410 enables the nodes 106A-N to receive information from, and transmit to the master device 102 and vice versa. The master/repeater communication unit 412 enables the nodes 106A-N to communicate with the master device 102 and the connected repeaters (e.g., the repeaters 104A-C). As depicted in FIG. 1, the master/repeater communication unit 412 enables the nodes 106C-D to directly communicate with the master device 102. In another example as depicted in FIG. 1, the master/repeater communication unit 412 enables the nodes 106A-B, and 106E-N to communicate with the master device 102 through the repeaters 104A-C. The controlling unit 414 controls operations and communications between the master device 102, the repeaters 104A-C and the nodes 106A-N. The sensors unit 416 may comprise, but not limited to, temperature and humidity sensors, light sensors, fire alarm sensors, leak sensors, motion sensors, proximity sensors, glass break sensors, driveway probes (to detect whether a vehicle is arriving inside or leaving from a premise), vibration sensors, and/or gas or smoke sensors, etc.

Figure 5A:
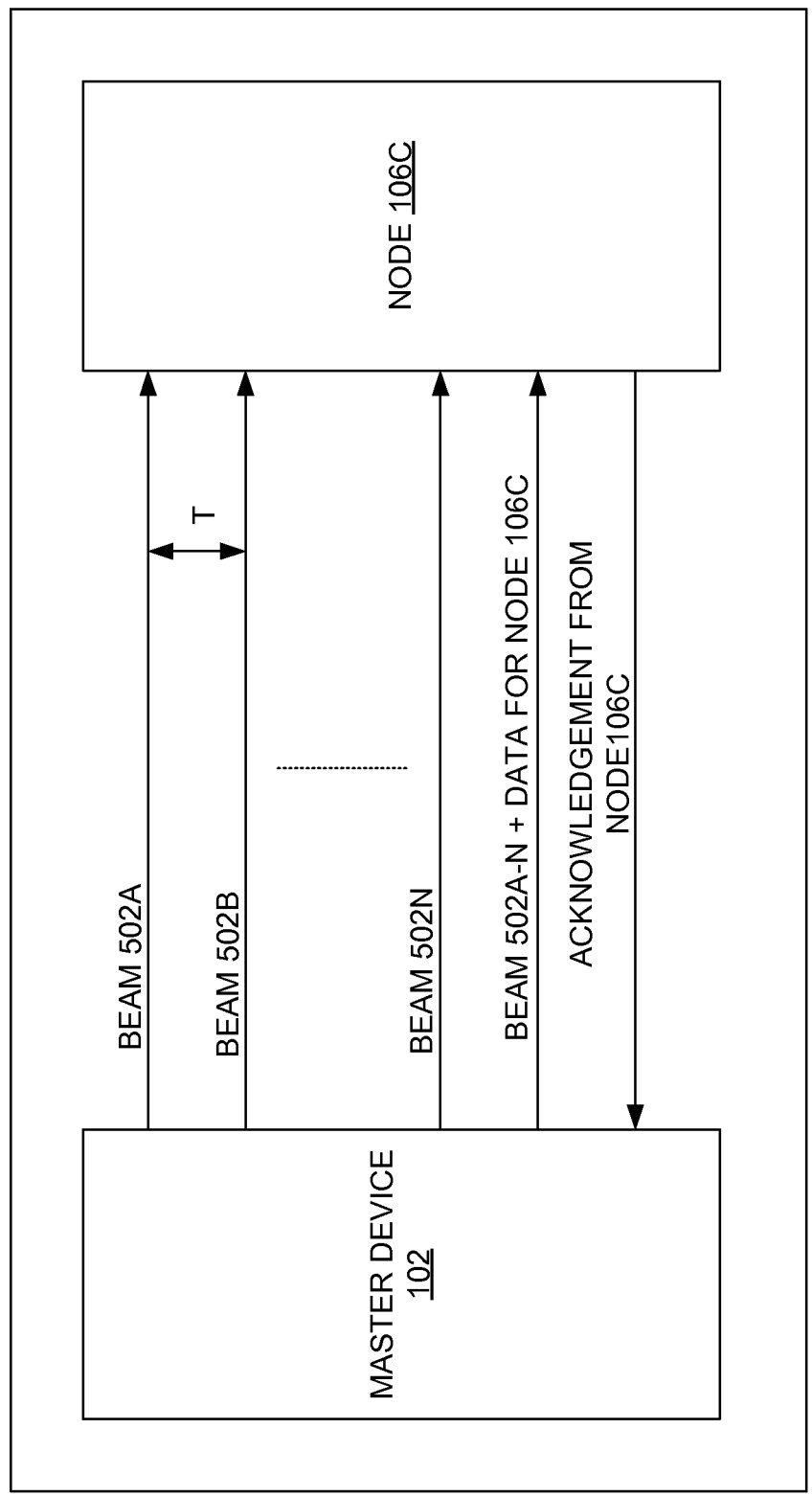
FIG. 5A is an interaction diagram illustrating a method of communication between the master device of FIG. 1 and a node of FIG. 1 according to an embodiment herein.

With reference to FIGS. 1 through 4, FIG. 5A is an interaction diagram illustrating a method of communication between the master device 102 of FIG. 1 and the node 106C of FIG. 1 according to an embodiment herein. More particularly, FIG. 5A illustration data transmission from the master device 102 to the node 106C. Although, FIG. 5A depicts communication between the master device 102 and the node 106C. It is to be understood to a person having ordinary skill in the art that the master device 102 communicates with other nodes 106B-N in a similar manner. One or more beams 502A-N are transmitted from the master device 102 to the node 106C. In response, the node 106C accepts data that is part of the beams 502A-N, and transmits data that comprises an acknowledgement upon successful transmission of the data to the node 106C. If the master device 102 does not receive an acknowledgement, the master device 102 resends the data with the next transmitting slot (or a designation slot) and repeats for a predefined number of times. If the communication fails, the master device 102 alerts the host (e.g., the server 110) about the particular node which is not responding. The beams are transmitted at predetermined time intervals (T) comprising T1, T2, . . . TN. This avoids periodic polling by the node 106C and other nodes 106A-N. Since the node 106C needs to sleep or turn off to conserve power, and they are not polling, the master device 102 communicates with the nodes and knows when the nodes are awake. This is achieved by synchronizing the network using a beam which the master device 102 transmits at predetermined time intervals comprising T1, T2. . . TN. When the master device 102 has data for a particular node (e.g., the node 106C, the master device 102 may send the data as part of the beam along with a specific address (or a unique network identifier) so that the intended node uses the data. The master device 102 may also send only data (without having to send a periodic beam) for a given designated slot, in a preferred embodiment. Hence the duration of the beam (t) will vary depending on if it has data appended or not. But the start of the beam will always occur after time T. If the node 106C wakes up and does not receive a beam in a given time, the node 106C knows that it is either out of sync or the master device 102 is off. If this happens, the node 106C does not turn off and waits for a period of 2*T, so that the node 106C synchronizes again after receiving the next beam. If the beam is still not received, the node 106C knows that the master device 102 the node 106C it is connected with has an issue and then it goes into a secondary polling mode till the master device 102 or the repeater recovers. Further, the communication channel for the secondary polling can be randomly selected by the master device 102 and hence the interference with the neighbouring network can be avoided. The same communication channel may be selected for the master device polling, by the nodes 106A-N to scan the communication network.

Figure 5B:
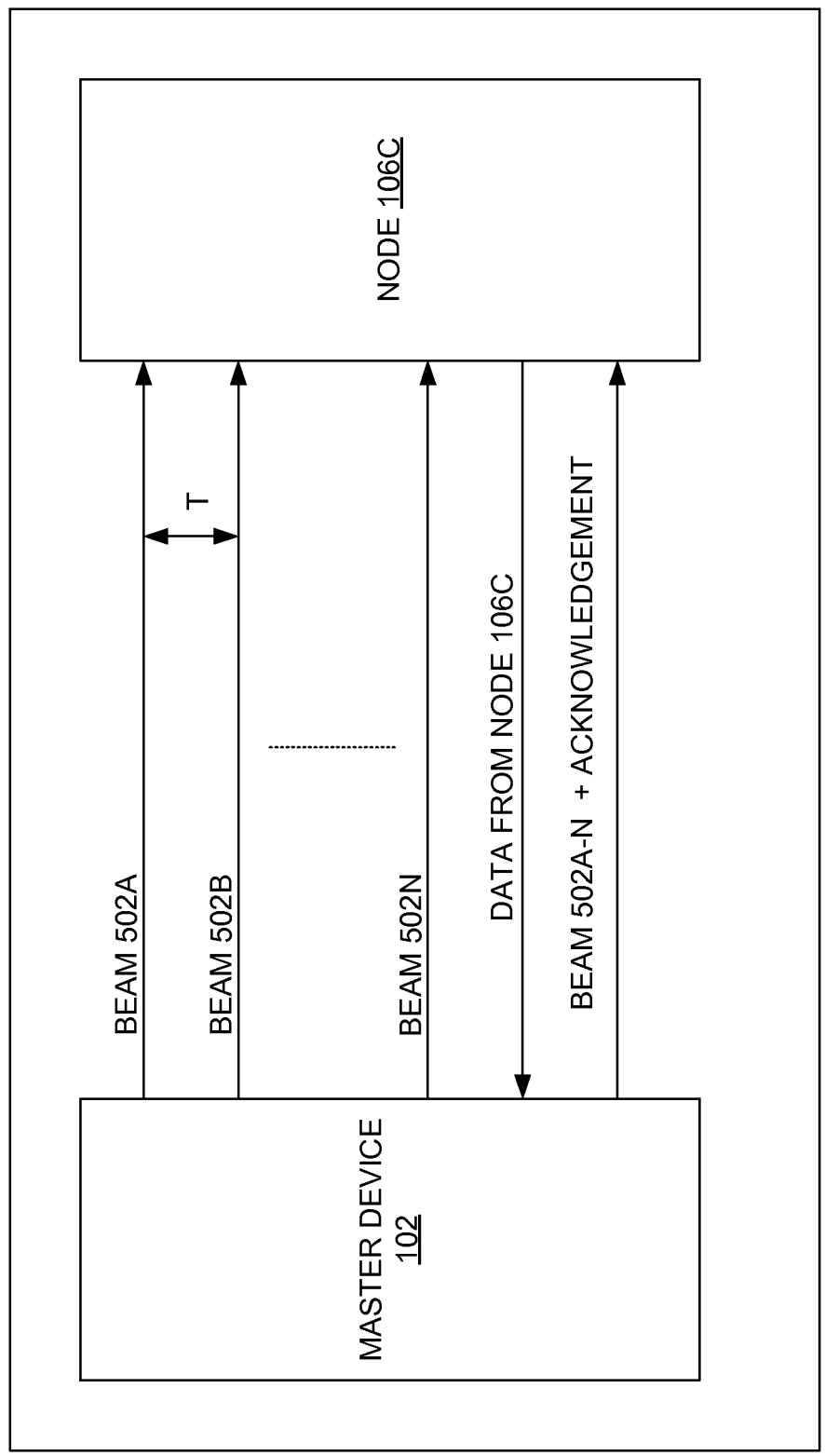
FIG. 5B is an interaction diagram illustrating a method of communication between the node of FIG. 1 and the master device of FIG. 1 according to an embodiment herein.
Figure 5C:
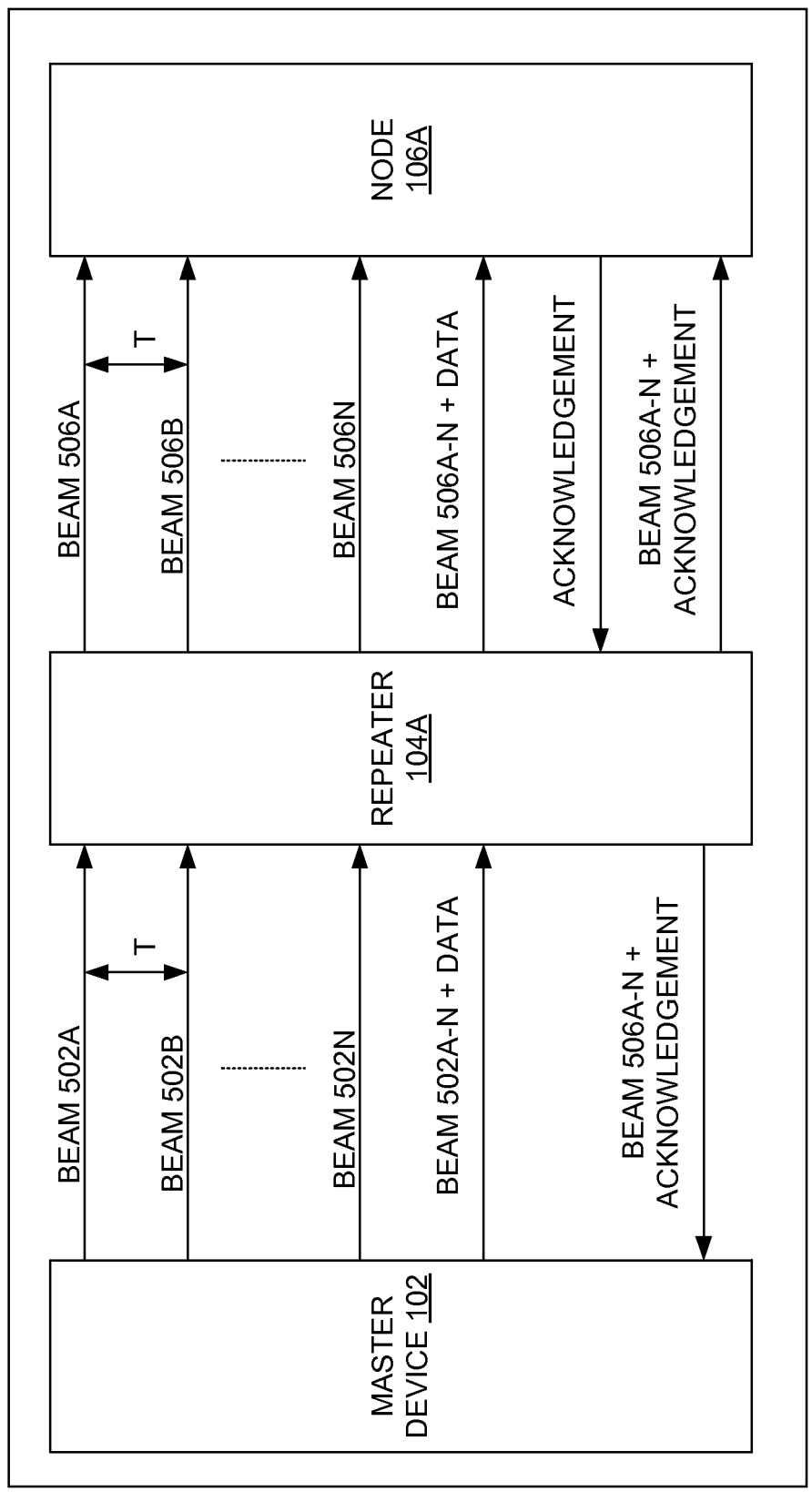
FIG. 5C is an interaction diagram illustrating a method of communication between the master device and a node through a repeater of FIG. 1 according to an embodiment herein.

With reference to FIGS. 1 through 5A, FIG. 5B is an interaction diagram illustrating a method of communication between the node 106C and the master device 102 according to an embodiment herein. More particularly, FIG. 5B illustration data transmission from the node 106C to the master device 102. The master device 102 sends the one or more master beams 502A-N to the node 106C. After transmitting the beams, the master device 102 goes into receive mode and keeps waiting for data from the node 106C. If there is an event on a particular node then that particular node (e.g., the node 106C) wakes up and transmits the given information. Before sending the data, the node 106C senses the channel to ensure there is no on-going transmission and then transmits the data. The master device 102 sends an acknowledgment with the next beam which completes the communication process. If the acknowledgement is not received with the next beam, the node 106C assumes that the packet it sent was lost and does a resend in the next cycle. The node 106C tries doing so for a pre-defined number of times and then gives up. Each time it tries, it backs off randomly from the time when the beam ends, senses the channel for no transmission and then sends the data. This avoids the collisions with other node which are trying to do the same.

With reference to FIGS. 1 through 5B, FIG. 5C is an interaction diagram illustrating a method of communication between the master device 102 and the node 106A through the repeater 104A according to an embodiment herein. The master device 102 sends the one or more periodical beams 502A-N to the repeater 104A. Similarly, the repeater 104A also sends one or more periodical beams 506A-N to the node 106A. The master device 102 sends data along with the periodical beam 502A-N to the node 106A through the repeater 104A. The repeater 104A receives the data which the master device 102 sent along with the periodical beams 502A-N. The repeater 104A sends the data to the node 106A along with the periodical beams 506A-N comprising a unique address. The node 106A sends an acknowledgement to the repeater 104A. Likewise, the repeater 104A acknowledges the data sent by the master device 102A. Any node can also be enabled to conduct repeater function only condition being that it cannot be powered down.

In a particular case, when the master device 102 or the repeater 104A fails, the nodes associated would be always be in ON state, looking for the beam and would drain their batteries. In this particular case, a secondary polling is implemented. Out of all the channels which are used for communication, one channel is picked as a polling channel by the master device 102 and communicated to the network. The master device 102 and the repeaters 104A-C can either have an additional radio (e.g., the secondary polling radio 214 of the master device 102 of FIG. 2) that always listens on this channel or they can designate a particular node which is wall powered to listen on this channel for polling requests when it is not transmitting and receiving. Whenever a node is out of synchronization, it initially listens for time=2*T to get the beam. If it does not receive the beam, it goes into secondary polling mode, where in it periodically sends a SOS message on the polling channel and waits for a response. The designated listener on the polling channel provides the status of the network. It provides the next expected time of the beam if network is up or a status message indicating the node that the network is down (or under maintenance). The nodes keep doing the low power polling till the network is up. They can also show the status to the user using light indication or a buzzer, if available. Further, the nodes 106A-N communicate with each other through the master device 102 or connected repeaters 104A-C by transmitting a beam comprising a message that comprises a header information to each node. For example, the node 106A can communicate with the node 106B through the repeater 106A and the master device 102 by specifying an appropriate address.

Figure 5D:
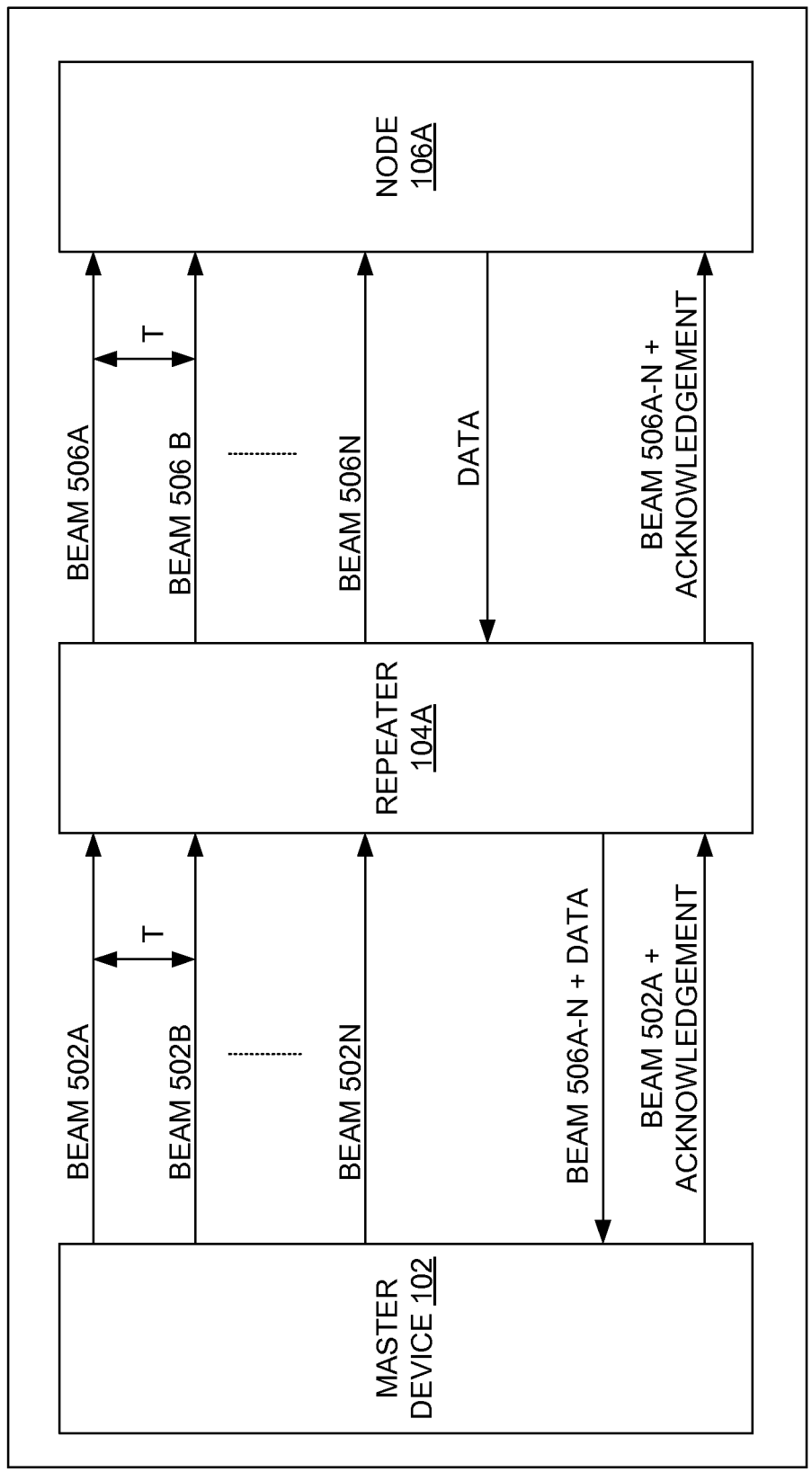
FIG. 5D is an interaction diagram illustrating a method of communication between the node and the master device through the repeater of FIG. 1 according to an embodiment herein.
Figure 5E:
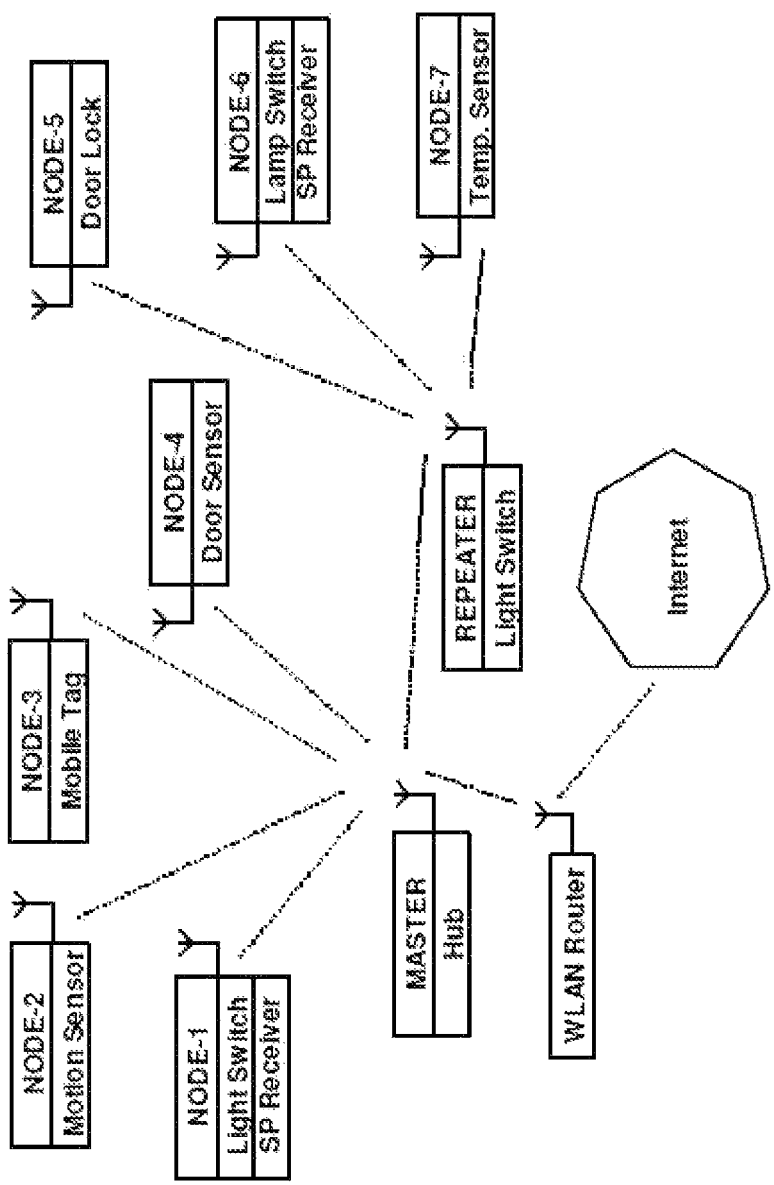
FIG. 5E illustrates the communication system with the nodes of FIG. 1 with secondary polling capability according to an embodiment herein.

With reference to FIGS. 1 through 5C, FIG. 5D is an interaction diagram illustrating a method of communication between the node 106A and the master device 102 through the repeater 104A according to an embodiment herein. In particular, FIG. 5D depicts an interaction diagram that illustrates the node 106A transmitting a data along with a beam to the repeater 104A which further transmits to the master device 102. The master device 102 sends an acknowledgement to the repeater 104A confirming successful data transmission. Likewise, the repeater 104A sends an acknowledgement to the node 106A confirming successful data transmission to the master device 102.

With reference to FIGS. 1 through 5D, FIG. 5E illustrates the communication system 100 with the nodes with secondary polling capability according to an embodiment herein. The master device 102 and the repeater 104A do not need to have the second radio. Only condition is that the node which supports secondary polling cannot go to sleep and hence typically should not be battery powered. When a node acts as a secondary polling node and whenever there is a query from a lost node, it just provides the information about the next beam, which it already has. The same technique can be used by mobile nodes. If the mobile nodes come back into the network after being away for a while, they can do a secondary polling and get the next time slot for the periodic beam to quickly synchronize back into the network without being on for longer time. The secondary polling is absolutely must if frequency hopping is used. Because then the node has to listen for time=8*2*T, if frequency hopping has 8 channels. If frequency hopping is not enabled, one more way to quickly synchronize is that the node can directly poll the master device 102 using CSMA technique. In this case if a node is not able to get the beam, one use case being a mobile tag (Node-3) being out of network, then it will wake up periodically, will poll the master device 102 and wait for a given time to get a response from the master device 102. If it does not get the response, it will do it again after a given period, which can be programmed. In this case the second radio is not required because when master device 102 is not transmitting it is listening and when the node sends SOS based on CSMA, the master device 102 would be in a listening mode and will always respond. If frequency hopping is not enabled, the master device 102 can randomly choose one of the predefined channels for communication, which ensures that the communication between the master device 102, repeaters 104A-C, and the nodes 106A-N does not interfere with the neighbouring network which runs on a different channel.

Alternatively, the first node 106A and the second node 106B scan the communication network using at least one of a secondary polling or a master device polling to obtain a time and a frequency of a subsequent beam that is to be transmitted by the master device 102 when the first node 106A and the second node 106B are disconnected from the communication network and reconnected to the communication network. Similarly, other nodes 106C-N scan the communication network using the secondary polling or a master device polling to obtain a time and a frequency of a subsequent beam that is to be transmitted by the master device 102 the nodes 106C-N are disconnected from, and reconnected to the communication network.

With reference to FIGS. 1 through 5E, FIG. 6A is a timing diagram that illustrates a transmission mode and a receiving mode of the master device 102 and the node 106A according to an embodiment herein. From the graphical representation, it is evident that the master device 102 sends one or more periodical beams to the node 106A. Once the master device 102 is in the transmission mode (denoted by Tx), the master device 102 transmits data to respective nodes through a periodic beam. After transmitting the periodic beam, the master device 102 goes to the receiving mode (denoted by Rx). Likewise, the nodes 106A-N are in receiving mode when they wake up and receive (or listen to) the periodic beam and accept data relevant to them. If the nodes 106A-N have data to be transmitted to the master device 102, the nodes 106A-N transmit data, else the nodes go to sleep mode.

Figure 6A:
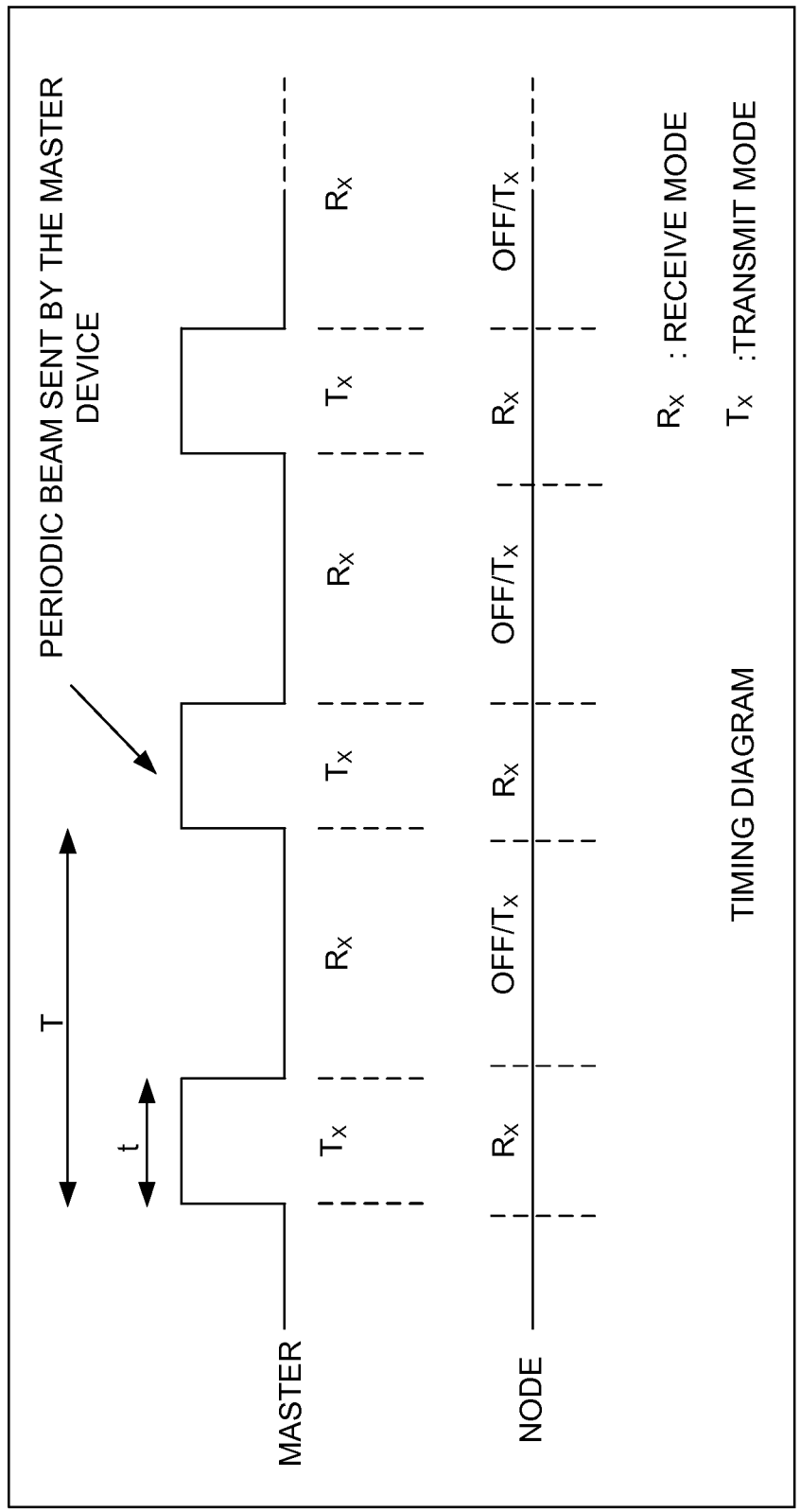
FIG. 6A is a timing diagram that illustrates a transmission mode and a receiving mode of the master device and the node of FIG. 1 according to an embodiment herein.
Figure 6B:
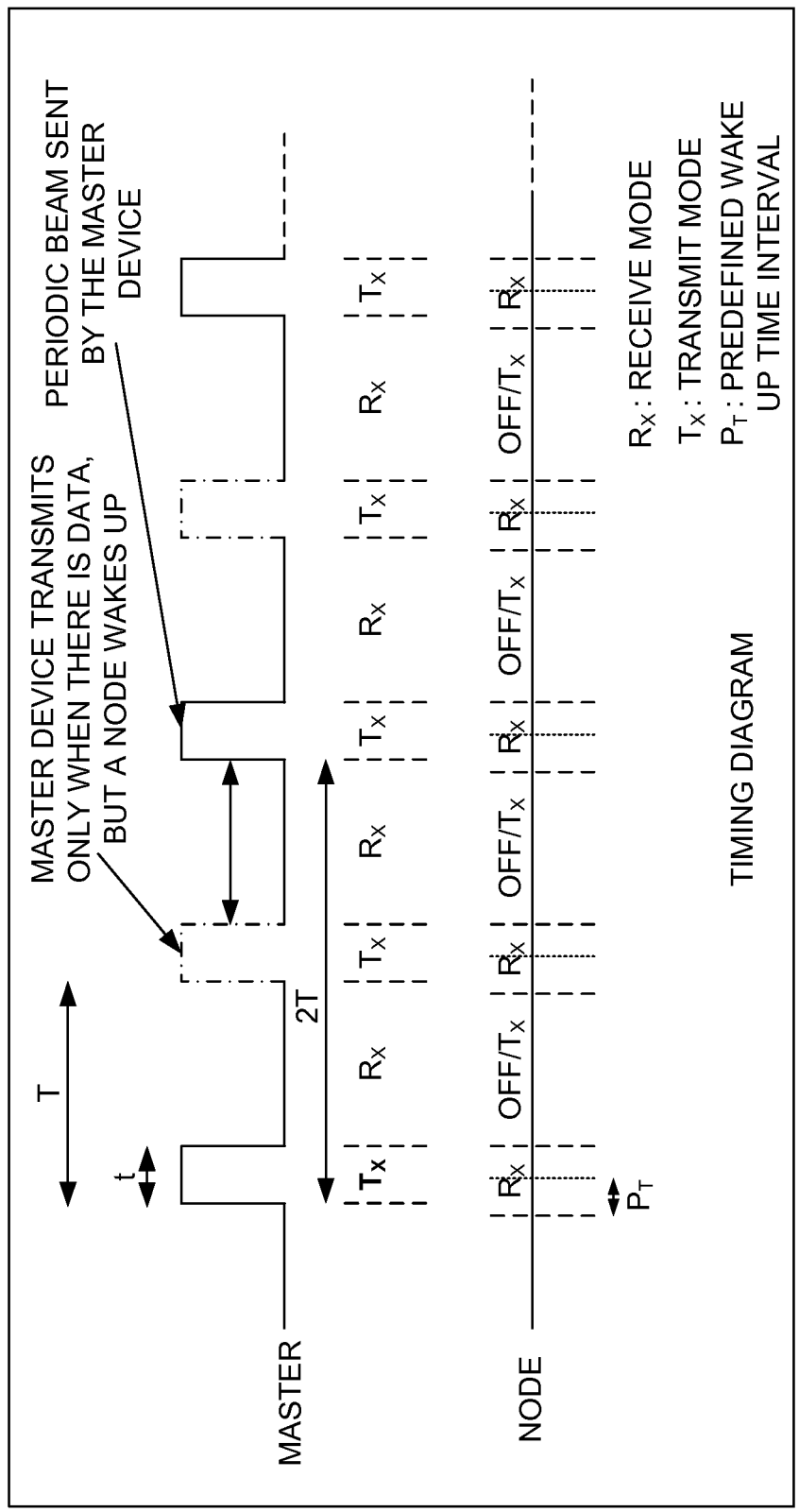
FIG. 6B is a timing diagram that illustrates a transmission mode and a receiving mode of the master device and the node of FIG. 1 according to an embodiment herein

With reference to FIG. 1 through FIG. 6A, FIG. 6B is a timing diagram that illustrates a transmission mode and a receiving mode of the master device 102 and the node 106A according to an embodiment herein. More particularly, FIG. 6B depicts a periodic beam sent by the master device 102, and the data transmission by the master device 102, but a node wakes up. FIG. 6B further depicts a predetermined wake up time interval ($P_T$). Each node (i) determines clock time period offset between a clock period of the node and a clock period of the master device 102 based on a number of periodic beams received from either the master device 102 or the repeaters 106A-C, (ii) calculates a next wake-up time comprising a node wake up time information based on the clock time period offset, (iii) resets the node clock to be in synchronization with the master clock of said master device 102 based on the clock time period offset, and (iv) periodically updates the clock time period offset based on a number of subsequent beams received by the node to obtain an updated clock time period offset. Since the node is aware of the updated clock time period offset, the node wakes up for the predetermined wake up time interval to receive at least one of (i) a periodic beam, (ii) data, or (iii) a periodic beam appended with data from the master device 102 specific to it. So, if there is any data in a designated slot transmitted by the master device 102, the node wakes up for the predetermined wake up time interval, and continues to be in a wake up mode and accepts the data. Based on the updated clock time period offset, each node computes a predetermined wake up time interval, in a preferred embodiment. When the node wakes up for the predetermined wake up time interval, and determines that there is no data, the node goes to sleep mode. If there was a data which was transmitted by the master device 102, but the data was not received by the node during the predetermined wake up time interval, the master device 102 attempts to transmit the same data in a next or subsequent designated slot such that the node receives it.

The accurate offset calculation further helps in reducing the beam transmission interval without losing the responsiveness of the system. This is achieved by master device 102 transmitting the beam only after n*T interval, n being any integer. But the node would wake up periodically after time interval m*T, where n is a multiple of m, and listen to the master device 102. If the master device 102 has any data for that node it will transmit in that Tx slot. If node does not observe any activity for a predefined time (e.g., the predetermined wake up time interval—$P_T$), it goes back to sleep immediately conserving more power. Different nodes can have different values of 'm' based on the required responsiveness. Thus reducing the periodic beam transmission frequency further helps in reducing the node power. In other words, the master device 102 is configured to reduce the periodic beams transmission to reduce interference since the nodes need not synchronize frequently as they know the offset between their clocks and the master's. This can be done without sacrificing the responsiveness. The master device 102 reduces the beam interval but can send the data to the nodes in its regular Tx slot (or designated slot), if required. Nodes are always awake in the Tx slot for the master device 102. If node does not receive any message from the master device 102 for a predefined time in the Tx slots, it can go back to sleep conserving more power. Thus reducing the beam frequency further helps in reducing the node power.

Figure 6C:
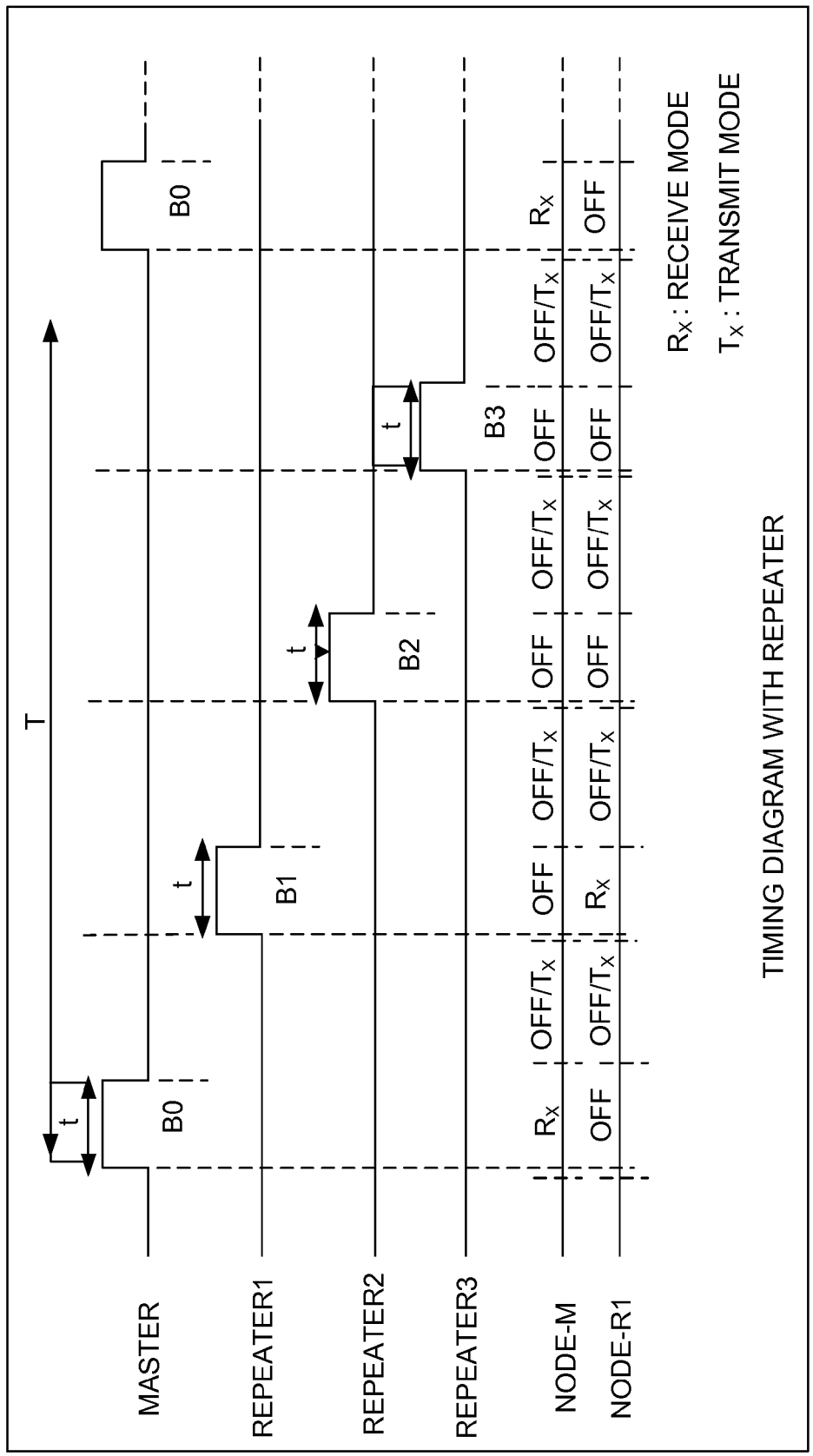
FIG. 6C is a timing diagram that illustrates a transmission mode and a receiving mode of the master device and the node through the repeater of FIG. 1 according to an embodiment herein.

With reference to FIGS. 1 through 6B, FIG. 6C is a timing diagram that illustrates a transmission mode and a receiving mode of the master device 102 and the node 106A through the repeater 104A according to an embodiment herein. Like nodes 106A-N, the repeaters 104A-C also associate with the communication network. For example, once the repeater 104A is associated with the communication network, the repeater 104A is given a designated slot to broadcast periodic beams. When a new node comes in the communication network, the new node can synchronize either with the master device 102 or with the repeater 104A (or any other repeater such as the repeater 104B or 104C), depending on the signal strength of the periodic beam it receives from them. It is evident from FIG. 6C, that there can be multiple repeaters associated within the communication network. As depicted in FIG. 6C, the repeaters 104A-C are given designated slots. The repeaters 104A-C listen all the time except when they have to transmit the periodic beams. For example, the repeater 104A is connected to the node 106A-B in FIG. 1. Routing information is dynamically provided by the master device 102 to the whole network. A node associated with the master device 102 will be always off in all the slots designated to the repeaters 104A-C and will transmit only in the available slots where neither the master device 102 nor the repeaters 104A-C are transmitting. Similarly a node associated with the repeater will listen for the periodic beam in the slot designated for that particular repeater.

As described in FIG. 1, the master device 102 stores the record of routing information for all nodes in the database 206. This routing information is initially collected during each node configuration. Routing information can also be extracted from the data received from a node. For instance, as depicted in FIG. 1, where the node 106E is associated with the repeater 104C which in turn is associated with the repeater 104A that is further associated with the master device 102. When the node 106E transmits data to the repeater 104C, the repeater 104C appends its address to the data and sends it to the repeater 104A, which also appends its address to data and sends it to the master device 102. This way the master device 102 receives the routing information for the node 106E and stores it for communication with the node 106E. Likewise, the master device 102 receives the routing information for the other nodes (e.g., the nodes A-B, and the nodes F-N) in a particular network and stores it for future communications with these nodes. The above routing methodology may be implemented for peer to peer communication. For example, in a peer to peer communication, the node 106E can send data to the node 106A by specifying 106A as a destination address. Once packet reaches to the master device 102, the master device 102 updates routing information for 106A and sends it in next Tx slot.

From the timing diagram of FIG. 6C, the first node 106A (i) determines a first time period offset between a clock period of the first node 106A and a clock period of the master device 102 based on the first periodic beam and the second periodic beam, (ii) calculates a next wake-up mode comprising a first node wake up time information specific based on the first time period offset, (iii) resets the first node clock to be in synchronization with the master clock of the master device based on the first time period offset, and (iv) periodically updates the first clock time period offset based on a number of subsequent beams received by the first node 106A to obtain a first updated clock time period offset. The first node 106A wakes up for a predetermined time interval (that is computed based on the updated clock time period offset) to receive at least one of (i) a periodic beam, (ii) data, and/or (iii) a periodic beam appended with data from the master device based on the first updated clock time period offset specific to the first node 106A. The first node 106A is configured to go in a sleep mode when at least one of (i) the periodic beam, (ii) the data, and/or (iii) the periodic beam appended with the data is not received during the predetermined time interval. Similarly, the second node 106B (i) determines a second clock time period offset between a clock period of the second node 106B and a clock period of the master device 102 based on the first periodic beam and the second periodic beam, (ii) calculates a next wake-up time comprising a second node wake up time information based on the second clock time period offset, (iii) resets the second node clock to be in synchronization with the master clock of the master device 102 based on the second clock time period offset, and (iv) periodically updates the second clock time period offset based on a number of subsequent beams received by the second node 106B to obtain a second updated clock time period offset. The second node 106B wakes up for a predetermined time interval (that is computed based on the updated clock time period offset) to receive at least one of (i) a periodic beam, (ii) data, and/or (iii) a periodic beam appended with data from the master device 102 based on the second updated clock time period offset specific to the second node 106B. The second node is configured to go in a sleep mode when at least one of (i) the periodic beam, (ii) the data, and/or (iii) the periodic beam appended with the data is not received during the predetermined time interval.

Likewise, other nodes 106C-N(i) operate in a similar fashion, (ii) calculate (or compute) (a) an updated clock time period offset and (b) a predetermined wake up time interval that is computed based on the updated clock time period offset, (iii) remain awake for a predetermined time interval to receive data, and (iv) go to sleep if the data is not received in the predetermined time interval. Thus, the nodes 106A-N wake up just before the next beam is transmitted by the master device 102 as depicted in the timing diagram of FIG. 6B.

Figure 6D:
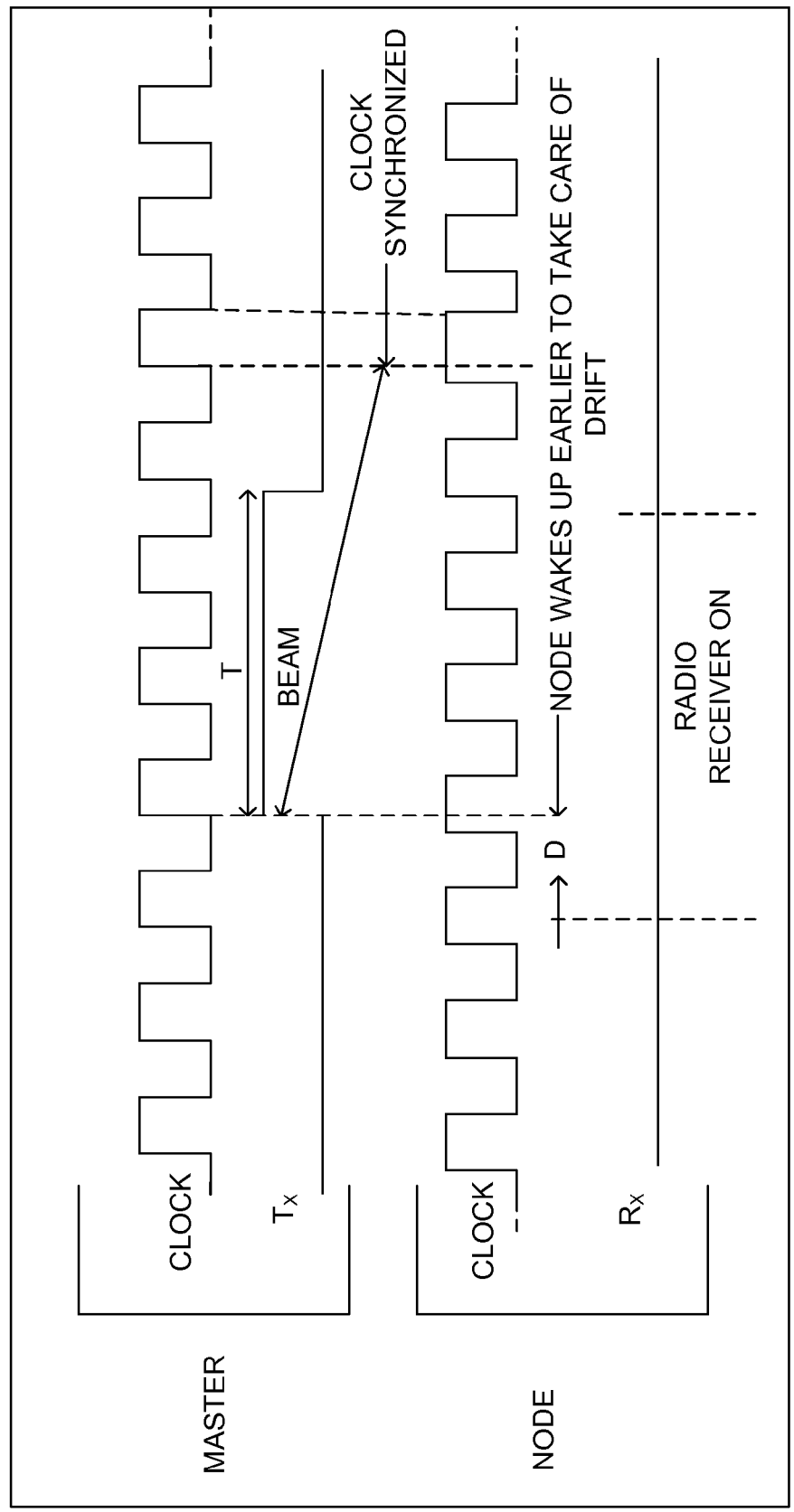
FIG. 6D is a timing diagram illustrating a node clock and a master clock synchronization to adjust the drift according to an embodiment herein.

FIG. 6D is a timing diagram illustrating node clock and master clock synchronization to adjust the drift according to an embodiment herein. When the master device 102 transmits a periodic beam to the node 106A, the node clock is reset by the node 106A and is in synchronization with the master clock. For example, system clock is derived from 32.768 kHz crystal oscillator and the accuracy of the crystal used is +/−20 ppm (parts per million). The maximum drift in time can be calculated to be 40 us for every second. So if the beam is transmitted every second, the node 106A has to wake up at least 40 us before to take care of the drift due to clock inaccuracy. Once the node 106A receives the beam, it resets its system clock to synchronize it with the start of the beam and hence gets synced with the master clock since the master device 102 is sending the beam on its master clock. The error in the time is not accumulated. Hence if the node 106A wakes up 40 us before the next beam, it will get the beam. In order to exactly synchronize with the beam, the node 106A initiates an internal timer as soon as the receiver of the node 106A confirms the start of the message. This timer keeps the record of the start of the beam time. The clock synchronization is held till the receiver confirms that the message is a valid message after checking the CRC bits, since it could be a spurious message caused by noise. Only after confirmation of valid message, the node clock is synchronized with the start of the beam by using the timing information of the start of the beam maintained by the timer.

If the beam is transmitted every 5 seconds, then the node 106A has to wakeup 200 us before. This will result in the node 106A being awake and listening for longer time and hence consuming more power. But every time the node 106A receives the beam, it gets the information of the timing offset between its own clock and the master clock. The node 106A stores this offset information and can use it to accurately calculate the wake-up time and hence avoid waking up earlier. For instance, assuming a drift between the node 106A and the master device 102 being 30 us. So when the node 106A receives the beam, it knows that master clock is faster and drifts 30 us for every sec, which can also be called as clock offset. So if the node 106 wants to wake up after 1 minute to get the beam in time, it can calculate the drift for 1 minute which is 30*60 us=1.8 ms. It then wakes up 1.8 ms earlier compared to actual time calculated by its own clock and can get the beam in time. Since there can be variations in the offset calculation, the node 106A can initially wake up more frequently, calculate the offset and keep averaging it till there is no appreciable deviation and then go back to reduced frequency of wake-up. The node 106A can then use this offset to make future decision on waking up after a long sleep cycle. Other nodes 106B-N also follow the same procedure to wake up earlier to receive periodic beams (or data transmitted in subsequent Tx slots) from the master device 102 or the repeaters 104A-C. For better understanding of the embodiments described herein, nodes 106A-B are illustrated and considered. It is to be further understood that other nodes calculate (or compute) corresponding offsets, and calculate (or compute) corresponding wake up times, and wake up just before the master device 102 transmits (i) the next beam, and/or (ii) subsequent data.

Figure 7A:
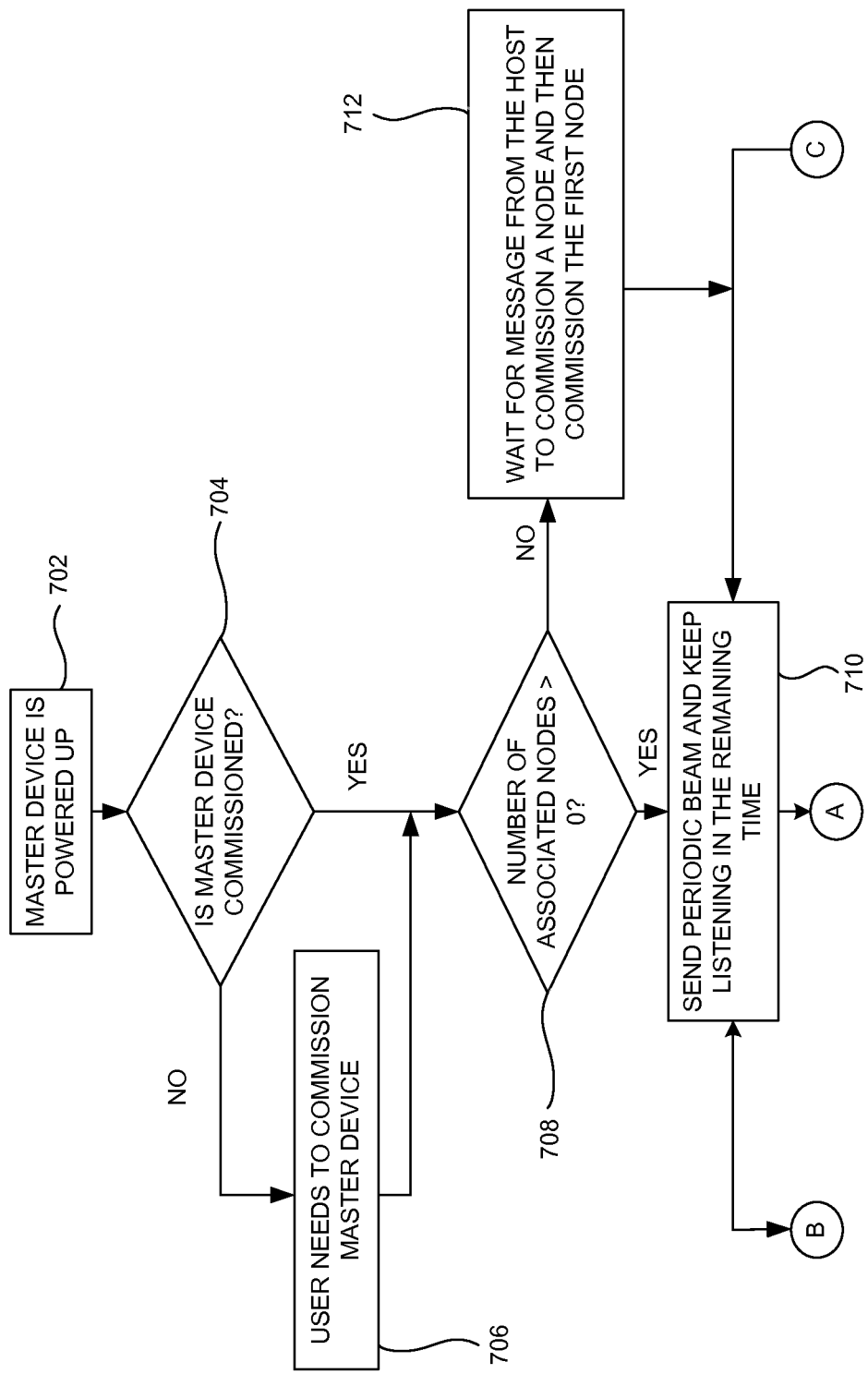
FIG. 7A-7B is a flow diagram illustrating functionalities of the master device of FIG. 1 according to an embodiment herein.
Figure 7B:
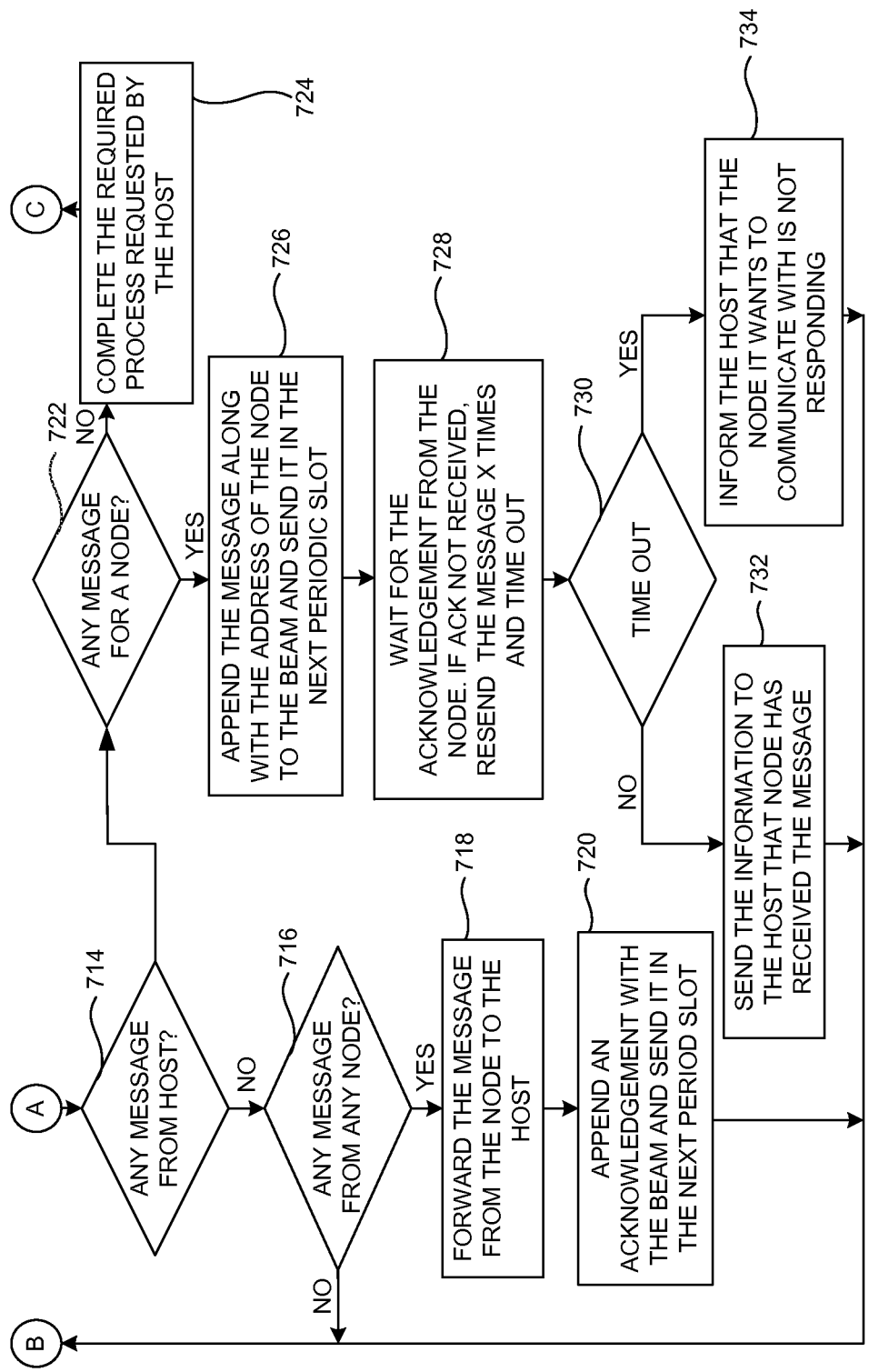
Figure 8A:
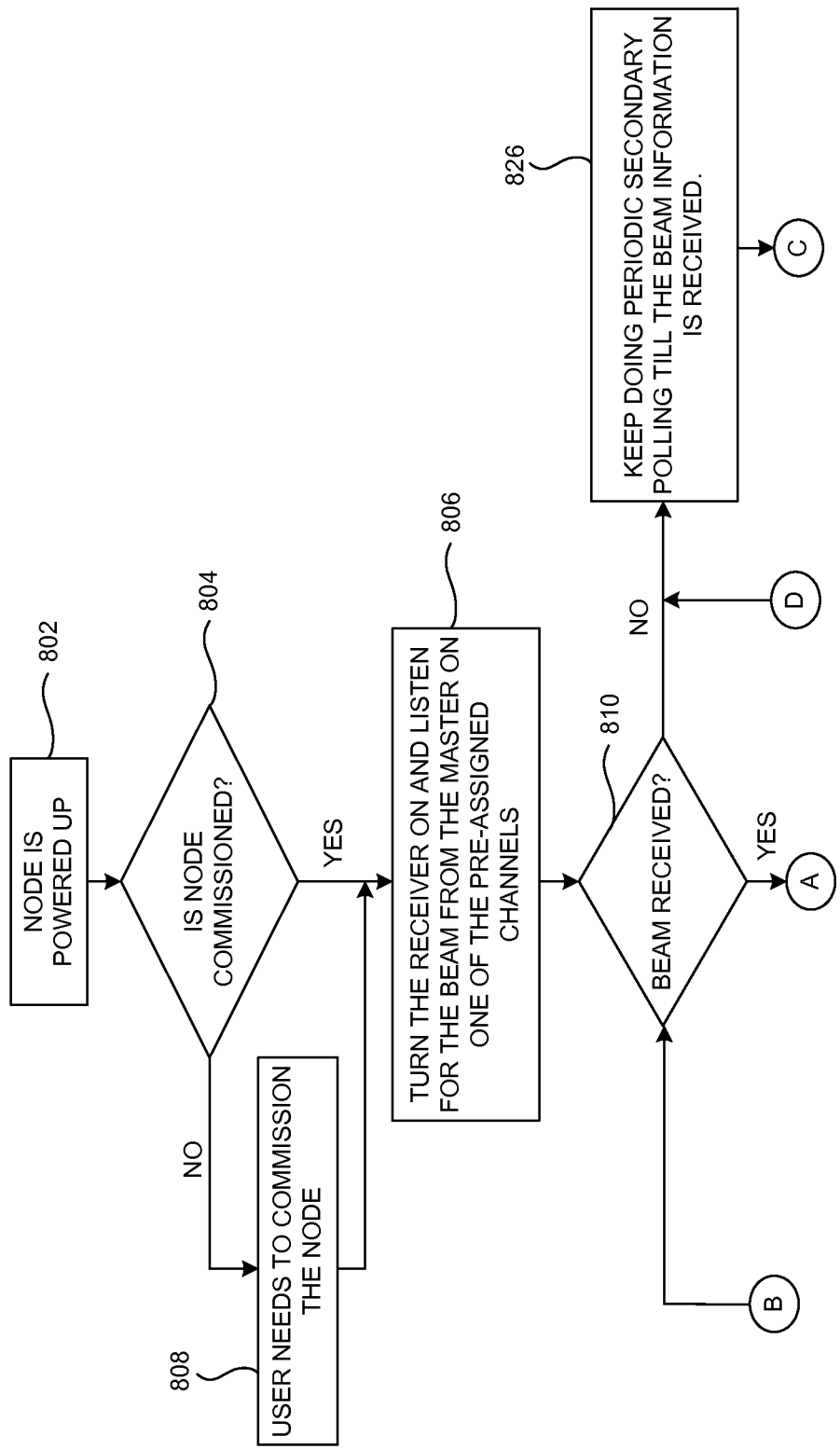
FIG. 8A-8B is a flow diagram that illustrates functionalities of the one or more nodes of FIG. 4 according to an embodiment herein.
Figure 8B:
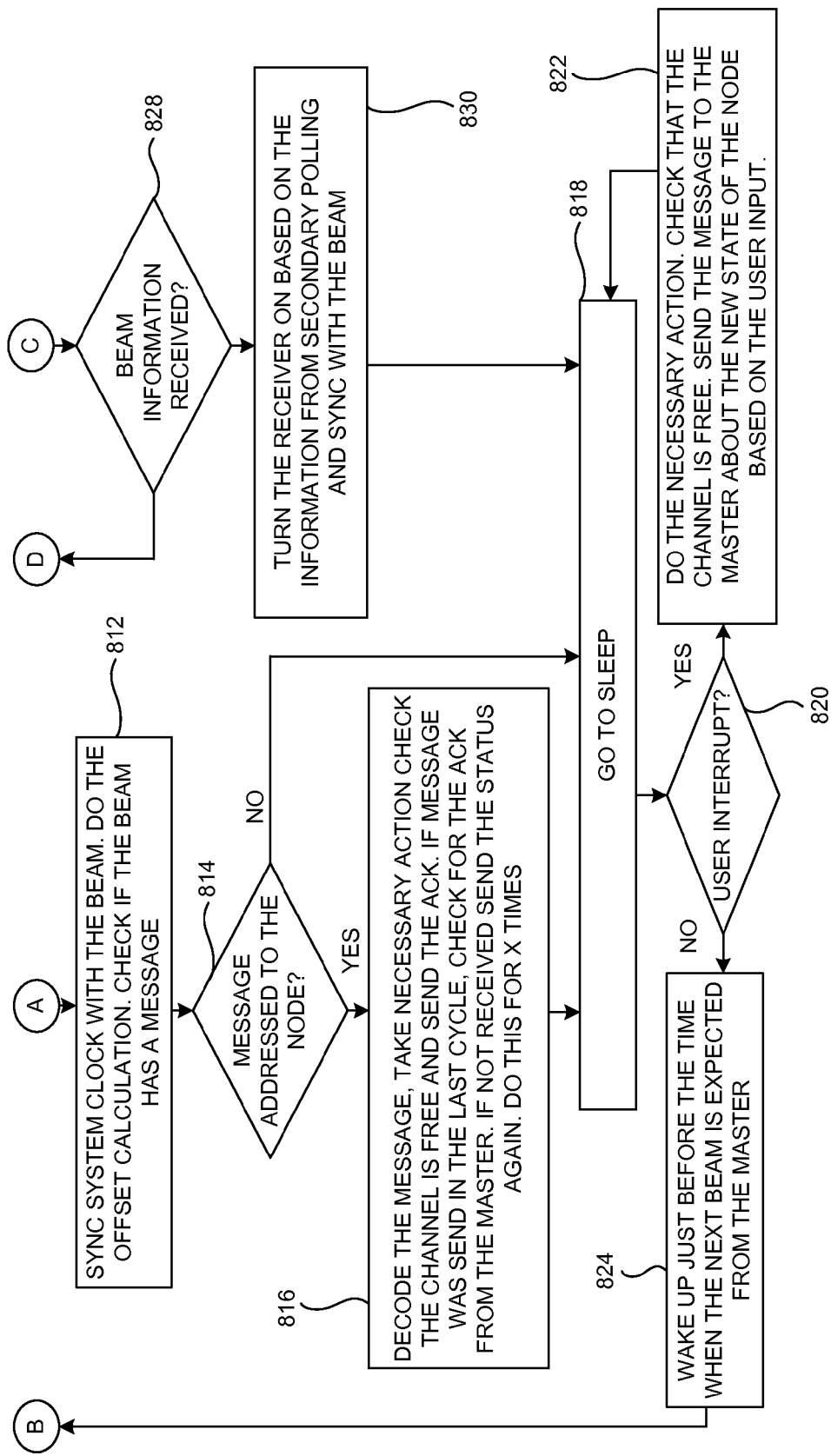
Figure 9A:
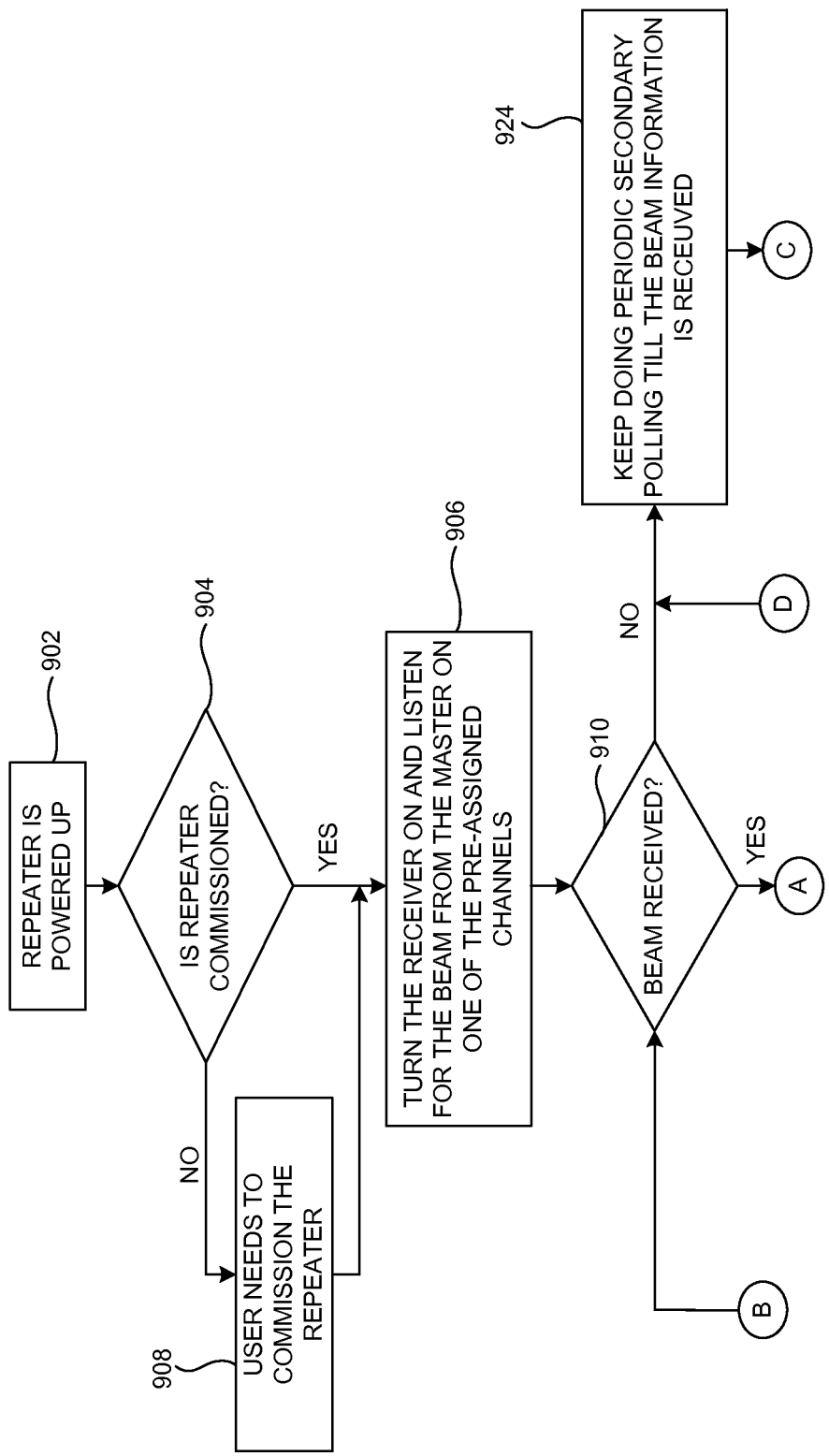
FIG. 9A-9B is a flow diagram that illustrates functionalities of the repeaters of FIG. 3 according to an embodiment herein.
Figure 9B:
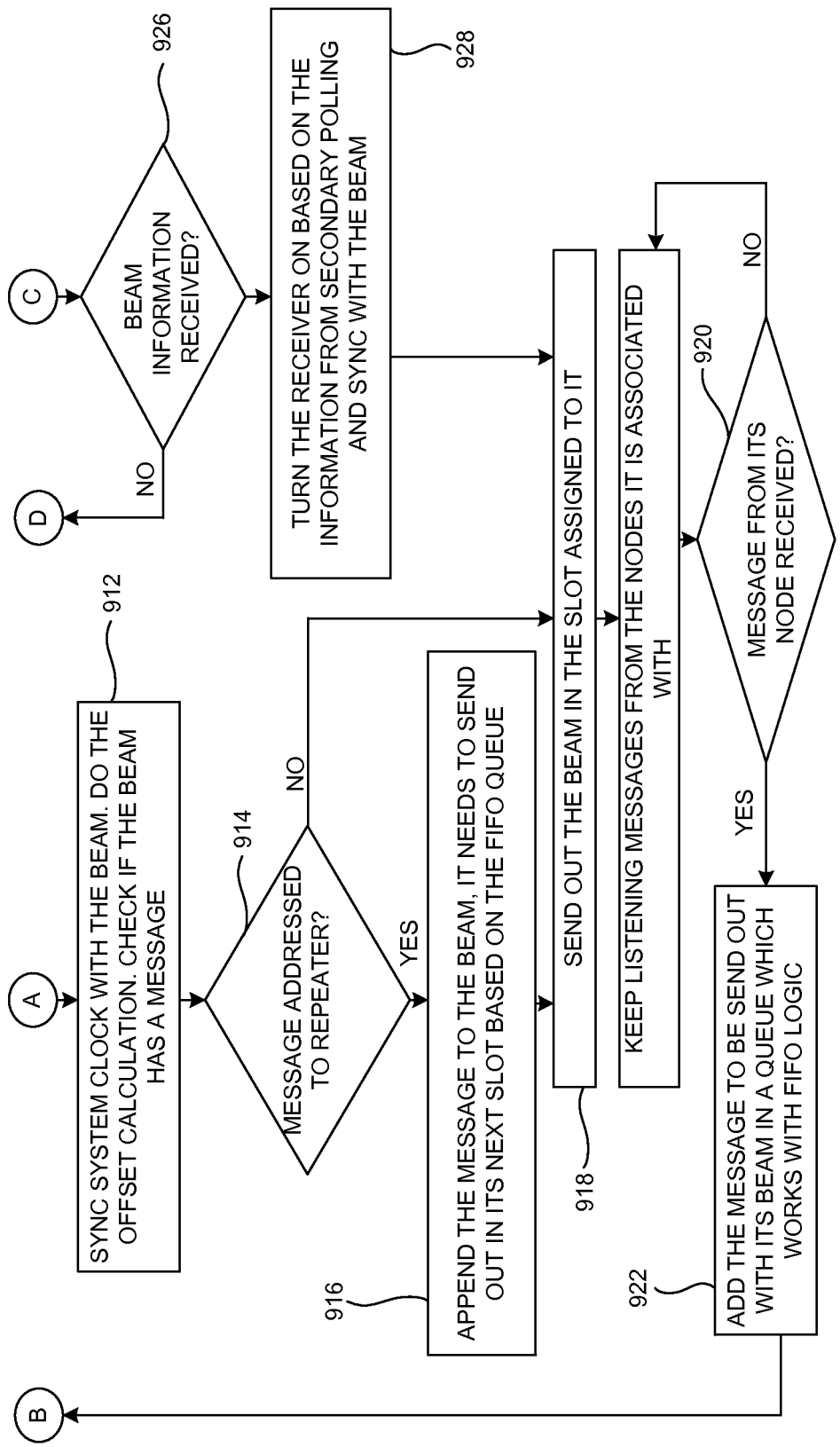

FIG. 7A-7B is a flow diagram illustrating functionalities of the master device 102 according to an embodiment herein. In step 702, the master device 102 is powered up. In step 704, it is checked with the master device 102 is commissioned. If the master device 102 is not commissioned, a user commissions the master device 102 in step 706, and it is checked whether the number of associated nodes is greater than zero (0) in step 708. If the number of associated nodes is greater than zero, the master device 102 transmits periodic beams to the nodes 106A-N, and keeps listening in the remaining time in step 710. If the number of associated nodes is not greater than zero, the host transmits a message comprising commission a node, and then a first node (e.g., the node 106A) is commissioned in step 712. Likewise, other nodes 106B-N are commissioned. In step 714, it is checked for a message from the host. If there is no message, it is checked whether there is a message from any of the nodes 106A-N in step 716. If there is a message from any of the nodes 106A-N, that message is forwarded from a particular node to the host in step 718, else step 710 is repeated. In step 720, if there is a message from any of the nodes 106A-N, an acknowledgement is appended with a periodic beam that is to be transmitted by the master device 102 in the next period slot, and the step 710 is repeated. In step 722, if there is any message from the host, it is checked whether there is any message to be transmitted to a node. If there is no message for the node, then the master device 102 completes the required process requested by the host in step 724, and the step 710 is repeated. In step 726, if there is a message for a node (e.g., the node 106A), the message is appended along with the address of the node 106A to the periodic beam and is transmitted in the next periodic slot. The message (or data) may be sent without a periodic beam, in a preferred embodiment. In step 728, the master device 102 waits for an acknowledgement from the node 106A. If the acknowledgement is not received, the master device 102 transmits the message for a predetermined number of time intervals and then terminates the transmission process. In step 730, it is checked whether it is time out. If it is not a time out, the information is transmitted by the master device 102 to the host that the node 106A has received the message in step 732, and the step 710 is repeated. If it is a time out, the master device 102 informs the host that the node 106A it wants to communicate is not responding at this given point of time in step 734, and the step 710 is repeated.

With reference to FIGS. 1 through 7B, FIG. 8A-8B is a flow diagram that illustrates functionalities of the one or more nodes 106A-N according to an embodiment herein. In step 802, the nodes 106A-N are powered up. In step 804, it is checked whether the nodes 106A-N are commissioned. In step 806, if the nodes 106A-N are commissioned the nodes 106 turn ON their respective receivers and listen for a periodic beam that is transmitted from the master device 102 on one of the assigned slots. In step 808, if the one or more nodes 106A-N are not commissioned, the user commissions the nodes 106A-N (or a particular node) and the step 806 is repeated. In step 810, it is checked whether the nodes 106A-N have received a periodic beam from the master device 102. If the periodic beam is received by the nodes 106A-N, the nodes 106A-N configure their node clocks and be in synchronization with the master clock, and also check if the periodic beam comprises any message in step 812. Additionally, the nodes 106A-N determine an offset when the periodic beam is on a different frequency. In step 814, each node 106A-N determines whether the message is relevant to them. If the message is relevant to at least node (e.g., the node 106A), then the node 106A decode the messages, triggers one or more actions, checks if the channel is free and send an acknowledgement, in step 816, and then goes to sleep in step 818. If message was sent in the last cycle, the node 106A checks for an acknowledgement from the master device 102. If not received, the node 106A sends the status again, and repeats for a predetermined time interval. If the message is not relevant to the node 106A, the node 106A listens to the periodic beam, and then goes to sleep in step 818. Other nodes 106B-N that determine that the message is relevant to them accept it, and then transmit an acknowledgement and/or other data and then go to sleep. In step 820, it is checked whether the user has interrupted. If the user has interrupted, the node 106A triggers one or more actions to be performed, checks that the channel is free, transmits a message to the master device 102 comprising a new state of the node 106A based on the user input in step 822, and then the node 106A goes to sleep (i.e., the step 818 is repeated). Else (if there is no interruption), the node 106A wakes up just before the time when the next periodic beam is expected from the master device 102, in step 824, and the step 810 is repeated.

With reference to FIGS. 1 through 8B, FIG. 9A-9B is a flow diagram that illustrates functionalities of the repeaters 104A-C according to an embodiment herein. In step 902, the repeaters 104A-C are powered up. For better understanding of the embodiments described herein, only one repeater (e.g., the repeater 104A) is considered and illustrated. In step 904, it is checked whether the repeater 104A is commissioned. If the repeater 104A is commissioned, the repeater 104A turns ON its receiver and listens for a periodic beam that is transmitted (or in transmission) from the master device 102 on at least one designated slot (or a channel) in step 906. If the repeater 104A is not commissioned, the user commissions the repeater 104A, in step 908 and the step 906 is repeated. In step 910, it is checked whether a periodic beam is received from the master device 102. If the periodic beam is received by the repeater 104A, the repeater 104A configures its repeater clock and be in synchronization with the master clock, and also check if the periodic beam comprises any message in step 912. In step 914, the repeater 104A checks (i) if the message is addressed to the repeater 104A, and (ii) the routing information in the message received from the master device 102. If the first address in the routing information matches with its own address then it removes its address from the routing information and it, appends the message along with the truncated routing information to the periodic beam that the repeater 104A needs to transmit it in its next slot based on the FIFO queue. In step 916, the repeater 104A sends out the periodic beam in the slot assigned to it. In step 918, the repeater 104A keeps listening for the messages from the node 106A it is associated with. In step 920, it is checked whether the repeater 104A has received a message from the node 106A. In step 922, if the message is received from the node 106A, the message is added to a periodic beam that is set in queue for transmission which works with FIFO logic, and the step 910 is repeated. If the message is not received by the repeater 104A, the repeater 104A keeps listening to the messages from the nodes it is associated with. When the periodic beam is not received in the step 910, the repeater 104A keeps doing periodic secondary polling till the beam information is received, in step 924. In step 926, it is checked whether beam information is received by the repeater 104A. If the beam information is received by the repeater 104A, the repeater 104A turns ON its receiver ON based on the information from secondary polling and synchronizes with the beam, in step 928 and the steps 918 is repeated. Else, if the beam information is not received, the step 924 is repeated.

Figure 10:
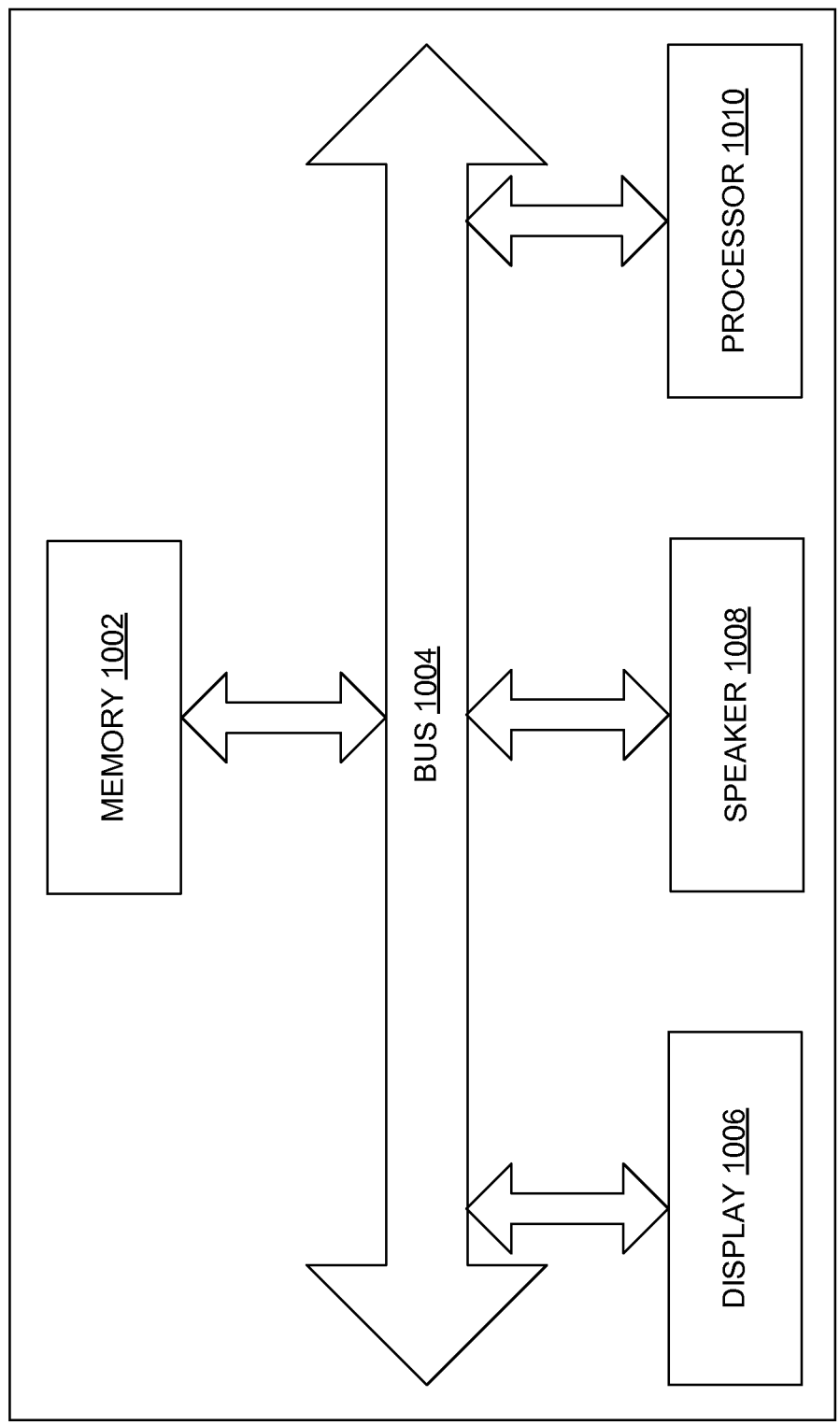
FIG. 10 illustrates a block diagram of a hardware component to carry out the methods described herein and in accordance with the embodiments herein.

FIG. 10 illustrates a block diagram of a hardware component having a memory 1002 having a set of machine executable instructions, a bus 1004, a display 1006, a speaker 1006 or audio for output via speaker and/or earphones 1010 may also carry out the methods described herein and in accordance with the embodiments herein. The hardware component comprises any of the master device 102, the one or more repeaters 104A-B and the one or more nodes 106A-N.

Digital content may also be stored in the memory 1002 for future processing or consumption. The memory 1002 may also store program specific information and/or service information (PSI/SI), including information about digital content (e.g., the detected information bits) available in the future or stored from the past. A user of the network devices may view this stored information on display 1006 and select an item of for viewing, listening, or other uses via input, which may take the form of keypad, scroll, or other input device(s) or combinations thereof. When digital content is selected, the processor 1010 may pass information. The content and PSI/SI may be passed among functions within the personal communication device using the bus 1004.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 11:
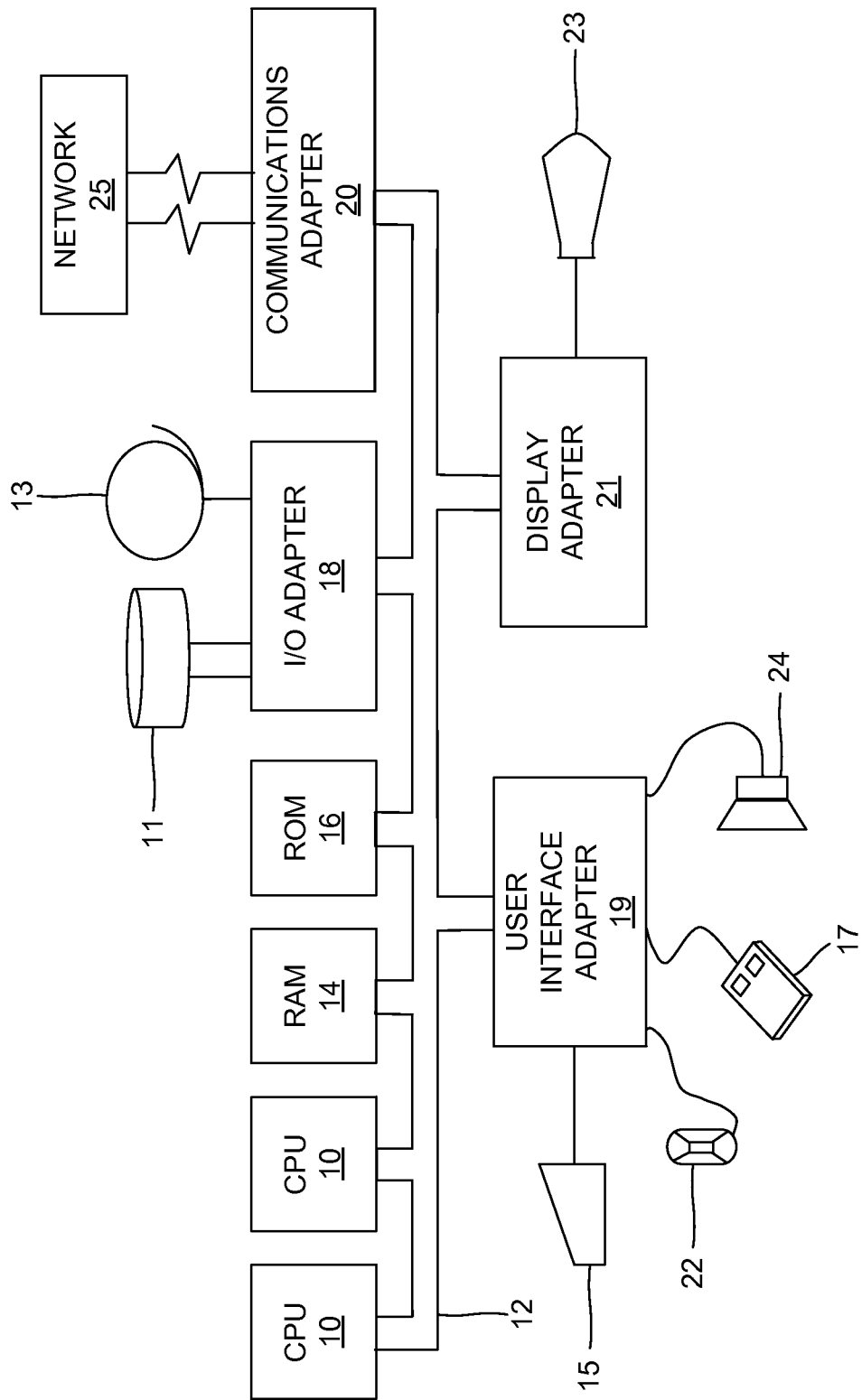
FIG. 11 is a block diagram of a computer system used in accordance with the embodiments herein.

A representative hardware environment for practicing the embodiments herein is depicted in FIG. 11. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Figure 12:
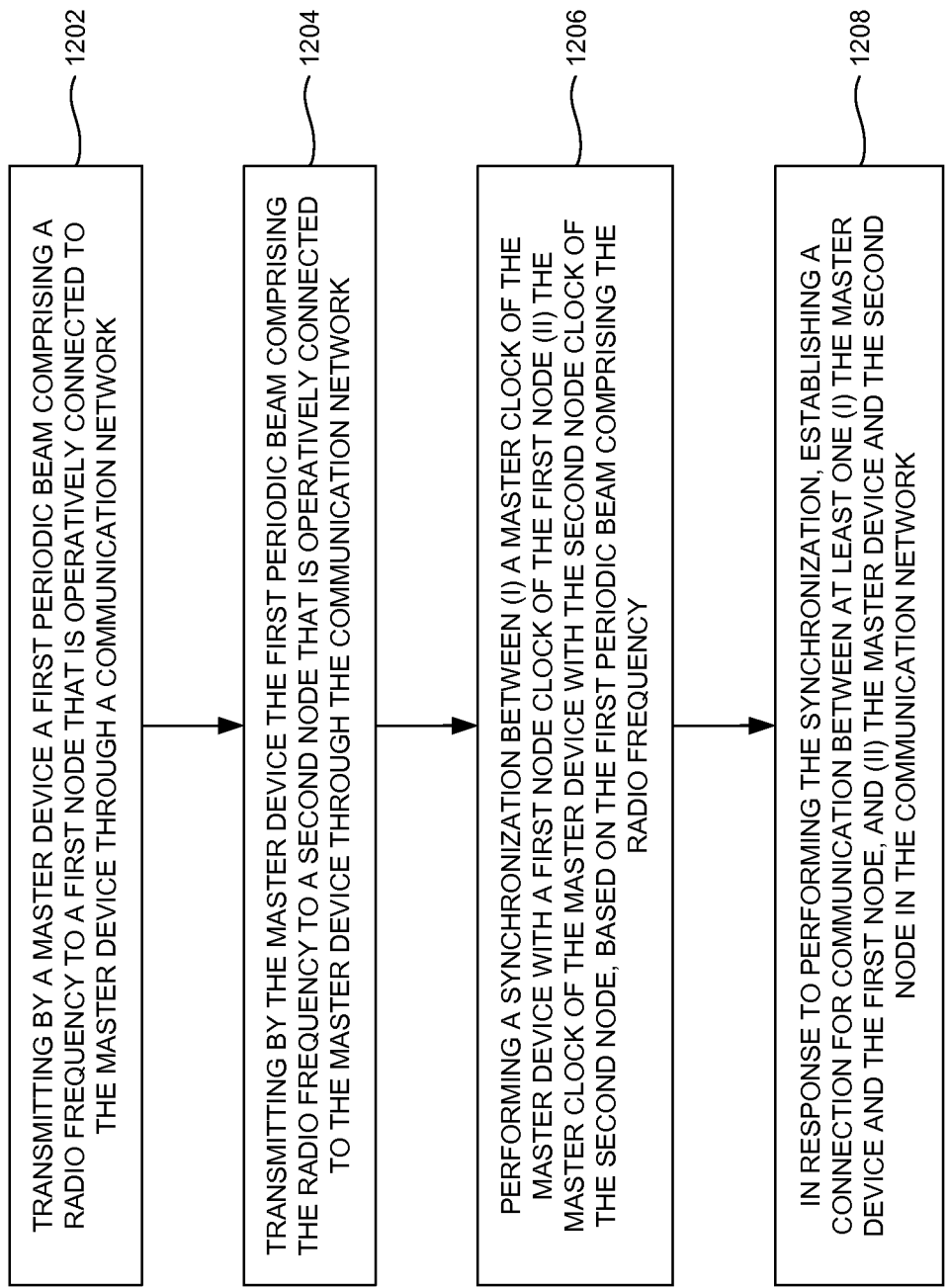
FIG. 12 is a flow diagram illustrating a communication method using the communication system of FIG. 1 according to an embodiment herein.

FIG. 12 is a flow diagram illustrating a communication method using the communication system 100 of FIG. 1 according to an embodiment herein, the method includes transmitting (1202), by the master device 102 a first periodic beam comprising a radio frequency to the first node 106A that is operatively connected to the master device 102 through a communication network, wherein the master device 102 comprises a master clock, and wherein the first node 106A comprises the first node 106A clock, transmitting (1204), by the master device 102 the first periodic beam comprising the radio frequency to the second node 106B that is operatively connected to the master device 102 through the communication network, wherein the second node 106B comprises the second node 106B clock, performing (1206), a synchronization between (i) the master clock of the master device 102 with the first node 106A clock of the first node 106A (ii) the master clock of the master device 102 with the second node 106B clock of the second node 106B, based on the first periodic beam comprising the radio frequency, and in response to performing the synchronization, establishing (1208), by the communication system 100, a connection for communication between at least one (i) the master device 102 and the first node 106A, and (ii) the master device 102 and the second node 106B in the communication network. The first periodic beam comprising the radio frequency radio may be transmitted to a repeater that is operatively connected to the master device 102 through the communication network, wherein the repeater transmits the first periodic beam to the first node 106A and the second node 106B. At least one of (i) a second periodic beam comprising (a) the radio frequency, (b) a unique network identifier and (ii) data that is specific to at least one of the first node 106A, and the second node 106B may be transmitted by the master device 102, and receiving by the master device 102 an acknowledgement from at least one of the first node 106A or the second node 106B when the data is received by at least one of the first node 106A or the second node 106B.

The communication system 100 consumes a low power for the same communication range, responsiveness and data rate. The repeaters 104A-B enable extend the range of frequency and size of network in the communication system 100. The communication system 100 is easy for commissioning, thus providing a reliable and secure network. The communication system 100 consumes low memory foot print, and is cost effective. Since transmit and the receive slots for the master device 102 and the repeaters 104A-B are fixed, implementation is simple and robust. The communication system 100 enables to dynamically program each node to reduce its wake-up frequency and hence conserve more power. If the user does not intend to use any of the devices for a given time, the communication system can program that particular device in low response mode and battery life can be further improved. Implementation of frequency hopping in the communication system 100 reduces interference and provides better intra-operability, which makes the communication network more reliable and secure. The communication system 100 further enables addition of repeaters in the communication network to extend the range of the network without adding any overhead to the network. Further, group addresses can be defined to control multiple nodes with similar functionality by a single control message.

An architecture according to the embodiments herein also helps in making the network more secure. Since the nodes listen for the master only in the pre-defined time slots, if an intruder has to communicate with the nodes, it has to transmit data only in the narrow slot assigned for the master, which is quite difficult unless the intruder is synchronized with the network. Suppose the intruder is synchronized with the network and tries to send the data in the designated master's slot, either the master would also transmit at the same time and there would be a collision, or if the master does not transmit then it listens in that slot and will know that there is a security breach and will flag it. Thus the proposed architecture provides strong inherent security which can be further enhanced by using standard encoding techniques.

The communication system 100 reduces the complexity of each node compared to existing schemes, as the network stack can be implemented on a tiny microcontroller with a Flash and RAM footprint. The implementation of the node in the communication system 100 requires less than 8 KByte Flash and 512 Byte RAM. This reduces the cost of the nodes enabling low cost objects to get connected to internet. The communication system 100 is implemented in various premises that include nodes comprising, but not limited to, smart homes like wireless switches, motion sensors, movement sensors, universal remote, etc. and the master device 102 comprising a hub or a gateway which connects to the internet.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

We claim:
1. A communication system, comprising:
  a master device connected to a host through a communication network, wherein said master device comprises a master clock;
  a first node operatively connected to said master device through said communication network, wherein said first node receives a first periodic beam comprising a radio frequency from said master device, wherein said first node comprises a first node clock that is configured and in synchronization with said master clock based on said first periodic beam comprising said radio frequency, wherein said first node
    (i) determines a first clock time period offset between a clock period of said first node and a clock period of said master device based on said first periodic beam and a second periodic beam,
    (ii) calculates a next wake-up time comprising a first node wake up time information specific based on said first clock time period offset,

(iii) resets said first node clock to be in synchronization with said master clock of said master device based on said first clock time period offset, and (iv) updates periodically said first clock time period offset based on a number of subsequent beams received by said first node to obtain a first updated clock time period offset, wherein said first node wakes up for a predetermined time interval to receive at least one of (i) a periodic beam, (ii) data, or (iii) a periodic beam appended with data from said master device based on said first updated clock time period offset specific to said first node, and wherein said first node is configured to go in a sleep mode when at least one of (i) said periodic beam, (ii) said data, or (iii) said periodic beam appended with said data is not received during said predetermined time interval; and a second node operatively connected to said master device through said communication network, wherein said second node receives said first periodic beam comprising said radio frequency from said master device, wherein said second node comprises a second node clock that is configured and in synchronization with said master clock based on said first periodic beam comprising said radio frequency, and wherein said communication system establishes a connection for communication between at least one of (i) said master device and said first node when said first node clock is in synchronization with said master clock, and (ii) said master device and said second node in said communication network when said second node clock is in synchronization with said master clock.

2. The communication system of claim 1, further comprising a first repeater that is operatively connected to said master device, said first node, and said second node through said communication network, wherein said first repeater (i) receives said first periodic beam comprising said radio frequency from said master device, and (ii) transmits said first periodic beam comprising said radio frequency to said communication network, wherein said first repeater synchronizes with said master clock based on said first periodic beam comprising said radio frequency.

3. The communication system of claim 1, wherein said master device transmits at least one of (i) said second periodic beam comprising (a) said radio frequency, (b) a unique network identifier, and (ii) data specific to at least one of said first node and said second node, and wherein at least one of said first node or said second node transmits an acknowledgement to said master device when said data is received by at least one of said first node and said second node.

4. The communication system of claim 1, wherein said second node (i) determines a second clock time period offset between a clock period of said second node and a clock period of said master device based on said first periodic beam and said second periodic beam, (ii) calculates a next wake-up time comprising a second node wake up time information based on said second clock time period offset, (iii) resets said second node clock to be in synchronization with said master clock of said master device based on said second clock time period offset, and (iv) updates periodically said second clock time period offset based on a number of subsequent beams received by said second node to obtain a second updated clock time period offset, wherein said second node wakes up for a predetermined time interval to receive at least one of (i) a periodic beam, (ii) data, or (iii) a periodic beam appended with data from said master device based on said second updated clock time period offset specific to said second node, and wherein said second node is configured to go in a sleep mode when at least one of (i) said periodic beam, (ii) said data, or (iii) said periodic beam appended with said data is not received during said predetermined time interval.

5. The communication system of claim 4, wherein said master device is further configured to reduce subsequent periodic beams transmission based on said first updated clock time period offset computed by said first node, and said second updated clock time period offset computed by said second node.

6. The communication system of claim 2, further comprising a second repeater operatively connected to said master device, said first repeater, and at least one of said first node and said second node, wherein said master device transmits at least one of (i) a periodic beam, (ii) data, or (iii) said periodic beam appended with said data to at least one of said first node and said second node through at least one of said first repeater and said second repeater, and wherein said first node communicates with said second node through said master device by transmitting a beam comprising a message that comprises a header information to said second node.

7. The communication system of claim 1, wherein said first node and said second node are configured to scan said communication network using at least one of a secondary polling or a master device polling to obtain a time and a frequency of a subsequent beam that is to be transmitted by said master device when at least one of said first node or said second node are disconnected from said communication network and reconnected to said communication network, wherein said secondary polling or said master device polling is done through a common communication channel.

8. A communication method, comprising:

transmitting by a master device a first periodic beam comprising a radio frequency to a first node that is operatively connected to said master device through a communication network, wherein said master device comprises a master clock, and wherein said first node comprises a first node clock;

determining, by said first node, a first clock time period offset between a clock period of said first node and a clock period of said master device based on said first periodic beam and a second periodic beam;

calculating, by said first node, a next wake-up time comprising a first node wake up time information specific based on said first clock time period offset;

resetting, by said first node, said first node clock to be in synchronization with said master clock of said master device based on said first clock time period offset;

updating, by said first node, periodically said first clock time period offset based on a number of subsequent periodic beams received by said first node to obtain a first updated clock time period offset, wherein said first node wakes up for a predetermined time interval to receive at least one of (i) a periodic beam, (ii) data, or (iii) a periodic beam appended with data from said master device based on said first updated clock time period offset specific to said first node, and wherein said first node is configured to go in a sleep mode when at least one of (i) said periodic beam, (ii) said data, or (iii) said periodic beam appended with said data is not received during said predetermined time interval;

transmitting by said master device said first periodic beam comprising said radio frequency to a second node that is operatively connected to said master device through said communication network, wherein said second node comprises a second node clock;

performing a synchronization between (i) said master clock of said master device with said first node clock of said first node (ii) said master clock of said master device with said second node clock of said second node, based on said first periodic beam comprising said radio frequency; and in response to performing said synchronization, establishing a connection for communication between at least one (i) said master device and said first node, and (ii) said master device and said second node in said communication network.

9. The communication method of claim 8, further comprising transmitting by said master device said first periodic beam comprising said radio frequency radio to a repeater that is operatively connected to said master device through said communication network, wherein said repeater transmits said first periodic beam to said first node and said second node.

10. The communication method of claim 8, further comprising transmitting by said master device at least one of (i) said second periodic beam comprising (a) said radio frequency, (b) a unique network identifier and (ii) data that is specific to at least one of said first node, and said second node; and receiving by said master device an acknowledgement from at least one of said first node or said second node when said data is received by at least one of said first node or said second node.

11. The communication method of claim 10, wherein said second node
(i) determines clock time period offset between a clock period of said second node and a clock period of said master device based on said first periodic beam and said second periodic beam,
(ii) calculates a next wake-up time comprising a second node wake up time information based on said second clock time period offset,
(iii) resets said second node clock to be in synchronization with said master clock of said master device based on said second clock time period offset, and
(iv) updates periodically said second clock time period offset based on a number of subsequent periodic beams received by said second node to obtain a second updated clock time period offset, and wherein said second node wakes up to receive at least one of (i) a periodic beam, (ii) data, or (iii) a periodic beam appended with data from said master device based on said second updated clock time period offset specific to said second node, and wherein said second node is configured to go in a sleep mode when at least one of (i) said periodic beam, (ii) said data, or (iii) said periodic beam appended with said data is not received during said predetermined time interval.

* * * * *